(12) United States Patent
Buck et al.

(10) Patent No.: US 11,792,158 B2
(45) Date of Patent: Oct. 17, 2023

(54) SERVICE PROTECTING PRIVACY WHILE MONITORING PASSWORD AND USERNAME USAGE

(71) Applicant: Lookout, Inc., San Francisco, CA (US)

(72) Inventors: Brian James Buck, Livermore, CA (US); Stephen Lind, El Cerrito, CA (US); Brian Sullivan, Jamaica Plain, MA (US)

(73) Assignee: Lookout, Inc., Boston, MA (US)

( * ) Notice: Subject to any disclaimer, the term of this patent is extended or adjusted under 35 U.S.C. 154(b) by 0 days.

(21) Appl. No.: 18/157,629

(22) Filed: Jan. 20, 2023

(65) Prior Publication Data

US 2023/0164112 A1 May 25, 2023

Related U.S. Application Data

(63) Continuation of application No. 17/694,533, filed on Mar. 14, 2022, now Pat. No. 11,570,144, which is a (Continued)

(51) Int. Cl.
*H04L 61/4511* (2022.01)
*H04L 61/5007* (2022.01)
*H04L 9/40* (2022.01)

(52) U.S. Cl.
CPC ...... *H04L 61/4511* (2022.05); *H04L 61/5007* (2022.05); *H04L 63/0407* (2013.01); *H04L 63/0428* (2013.01); *H04L 63/10* (2013.01)

(58) Field of Classification Search
CPC ............. H04L 61/4511; H04L 61/5007; H04L 63/0407; H04L 63/0428; H04L 63/10
See application file for complete search history.

(56) References Cited

U.S. PATENT DOCUMENTS 7,757,278 B2 * 7/2010 Boneh ................ H04L 63/0428
380/255
9,736,147 B1 * 8/2017 Mead ...................... G06F 21/31
(Continued)

FOREIGN PATENT DOCUMENTS

CN 101479987 A * 7/2009 ............. G06F 21/32
CN 104580092 A * 4/2015 ....... G06F 17/30861
(Continued)

OTHER PUBLICATIONS

Series X: Data Networks, Open System Communications and Security Directory Information technology—Open Systems Interconnection—The Directory: Public-key and attribute certificate frameworks, Recommendation ITU-T X.509. (Year: 2019).*
(Continued)

*Primary Examiner* — Alina A Boutah
(74) *Attorney, Agent, or Firm* — Dergosits & Noah LLP

(57) ABSTRACT

A service monitors password and username use while maintaining username and password privacy by receiving a hash of a username, a hash of a password, and a host name and comparing the received hashes against a database of associated host names and hashes of usernames and passwords. When the comparison determines that the hash of the new password meets certain conditions, e.g., no hash in the database matches the hash of the new password, then the new password may be allowed and the service informs the security component accordingly.

20 Claims, 12 Drawing Sheets

Related U.S. Application Data continuation of application No. 16/894,537, filed on Jun. 5, 2020, now Pat. No. 11,277,373.

(60) Provisional application No. 62/878,283, filed on Jul. 24, 2019.

(56) References Cited

U.S. PATENT DOCUMENTS

| | | | | |
|---|---|---|---|---|
| 10,051,001 | B1* | 8/2018 | Ashley | H04L 63/083 |
| 10,103,878 | B1* | 10/2018 | Sharifi Mehr | H04L 9/3226 |
| 2003/0163737 | A1* | 8/2003 | Roskind | H04L 9/3236 |
| | | | | 726/6 |
| 2008/0046369 | A1* | 2/2008 | Wood | H04L 9/3226 |
| | | | | 705/50 |
| 2008/0077809 | A1* | 3/2008 | Hayler | H04L 63/083 |
| | | | | 713/193 |
| 2008/0313721 | A1* | 12/2008 | Corella | H04L 63/10 |
| | | | | 726/6 |
| 2014/0298419 | A1* | 10/2014 | Boubez | H04L 63/08 |
| | | | | 726/4 |
| 2017/0346853 | A1* | 11/2017 | Wyatt | H04L 63/1425 |
| 2018/0288026 | A1* | 10/2018 | Callaghan | H04L 9/3226 |
| 2019/0356668 | A1* | 11/2019 | Alcorn | H04L 9/3215 |
| 2020/0187004 | A1* | 6/2020 | Reimer | G06F 21/602 |

FOREIGN PATENT DOCUMENTS

| | | | | |
|---|---|---|---|---|
| CN | 108781163 | A * | 11/2018 | G06F 21/34 |
| CN | 106650514 | B * | 6/2019 | G06F 21/83 |
| EP | 2981022 | A1 * | 2/2016 | H04L 61/2589 |
| ES | 2836114 | T3 * | 6/2021 | H04L 63/0428 |
| WO | WO-2014138882 | A1 * | 9/2014 | G06F 21/6218 |
| WO | WO-2016039309 | A1 * | 3/2016 | G06F 21/34 |

OTHER PUBLICATIONS

Edmundson et al., "ODNS: Oblivious DNS," OARC 28, Mar. 9, 2018, 20 pages.

Edmundson et al., "ODNS: Oblivious DNS," https://odns.cs.princeton.edu/, Mar. 29, 2018, 2 pages.

Edmundson, "Oblivious DNS: Plugging the Internet's Biggest Privacy Hole," Freedom To Tinker, https://freedom-to-tinker.com/2018/04/02/a-privacy-preserving-approach-to-dns/, Apr. 2, 2018, 7 pages.

Schmitt et al., "Oblivious DNS: Practical Privacy for DNS Queries," Proceedings on Privacy Enhancing Technologies, 2019 (2):228-244.

* cited by examiner

SERVICE PROTECTING PRIVACY WHILE MONITORING PASSWORD AND USERNAME USAGE

CROSS REFERENCE TO RELATED CASES

This application is a continuation of U.S. patent application Ser. No. 17/694,533, entitled "PROTECTING CLIENT PRIVACY DURING BROWSING," filed Mar. 14, 2022, which is a continuation of U.S. patent application Ser. No. 16/894,537, entitled "SECURITY DURING DOMAIN NAME RESOLUTION AND BROWSING," filed Jun. 5, 2020, now U.S. Pat. No. 11,277,373, which claims priority to U.S. Provisional Patent Application No. 62/878,283, entitled "MOBILE SECURITY," filed Jul. 24, 2019, each of which is incorporated by reference in its entirety.

TECHNICAL FIELD

The claimed subject matter relates generally to the field of network security and more specifically to enhancing network security while maintaining aspects of client and destination anonymity.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

Figure 1:
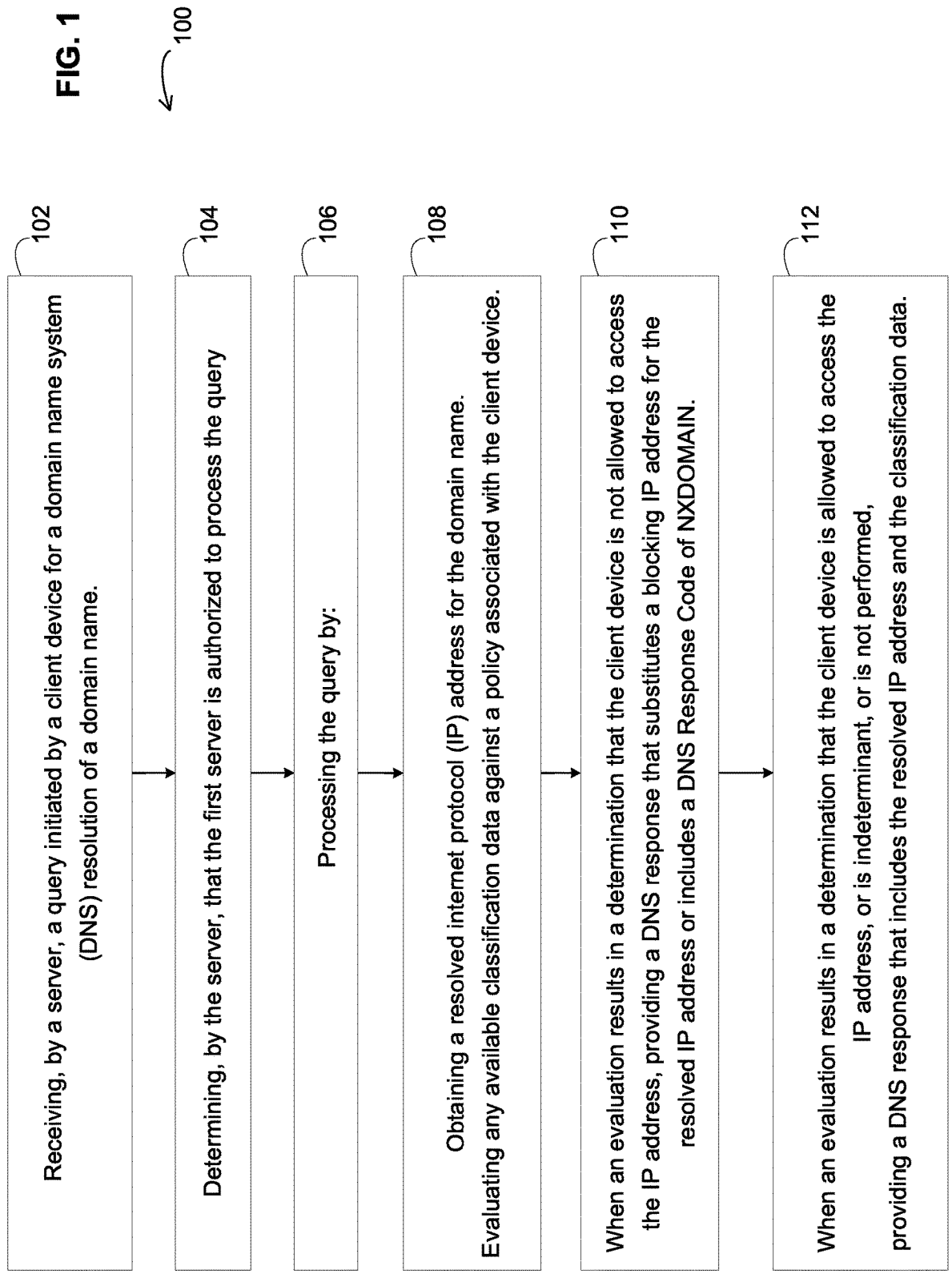
FIG. 1 is a flow chart of a method for resolving a domain name according to an embodiment.

Typically a query for Domain Name System (DNS) resolution does not have a mechanism for authenticating the client that sent the DNS query. While a recursive DNS server or an authoritative DNS server might have security associated with it that allows the server to identify and verify the server that forwarded the DNS query, a DNS server generally lacks the ability to identify and verify the client or group of clients from which the query originated.

The inability to verify the client or group of client hinders the use of services that might protect the client from, e.g., phishing or malicious content. For example, a protective service might inspect the domain that is the subject of a DNS query from a client where the domain is the intended destination of, e.g., an application, a browser, or otherwise the user. The protective service might have resources, e.g., a database, that allow the protective service to compare the domain against its resources and determine whether the domain has a good or bad reputation, is a known phishing site, or is otherwise a destination that should be avoided. However, it might be preferred that the protective service is only available to clients that have subscribed to the service, or to clients that are part of a subscribed group, such as an enterprise's fleet of mobile communications devices. The protective service might be a service that is internal to an enterprise, or might be provided by a third party.

Thus, it would be desirable for the protective service to have a method for identifying and authenticating the client that initiated the DNS query where the method does not increase the number of related queries from the client or increase the number of related responses sent to the client.

In a related issue, a client may wish to resolve a domain name without the resolving DNS server being able to associate the domain name with the client. That is, a client may want to preserve privacy while browsing. In this regard, services are available that purport to create a private DNS resolver for a client. For example, a private DNS resolver may purport to maintain client privacy and not sell client data to advertisers. Such a private DNS resolver may be provided at a Wi-Fi hotspot. The private DNS resolver may encrypt a received DNS query before forwarding that query on to the public DNS resolver.

Such a private DNS resolver requires a transfer of trust. While the client may be protected from having its packets intercepted, the client has to trust the private DNS resolver, itself, to keep its browsing history private. Additionally, the client has to trust that the private DNS resolver is secure and not susceptible to a hack that would expose the client's browsing history.

Thus, it would be desirable for a client to be able to initiate a DNS query and receive a resolution without any server involved in the resolution having an association of that client with that client's browsing history. In other words, the client may wish a greater assurance of privacy than that available from the private DNS resolver, a degree of privacy such that there is no possible association made from between the client (user, client device, or IP address) and the domain.

In a related issue, the client may wish to employ a service that provides browsing protection while also preserving privacy. That is, during a browsing session, it would be desirable for the client to be able to employ a protective service to assess the destination domain without the protective service knowing the client identity. The ability of an application on a client device to assess a URL in real-time, i.e., to dynamically assess the URL, is limited. While a browser may compare a URL against a whitelist or blacklist, e.g., using a content filter extension point, there are limited ways to assess the URL if it is not on either list. For example, often, for privacy reasons, the browser is typically not able to communicate in real time to a server to get an assessment of a URL.

Furthermore, the entire URL—the domain plus the rest of the full path—is often important in making an assessment. However, non-browser applications normally do not have access to the entire URL because the full path is sent over an encrypted connection.

Thus, while browsing it would be desirable to be able to send a URL to a protective service that dynamically assesses the domain using the entire URL (i.e., the domain plus the full path) and returns the assessment to the client without the protective service knowing the identity of the client.

Regarding an additional privacy issue, the re-use of password credentials may result in the loss of password credentials for one user account leading to the breach of additional user accounts. For example, password credentials obtained during one breach provide an obvious first place for a hacker to start when attempting to breach a second website. Password re-use is a well-known bad practice, yet it persists because it is convenient for users.

Such re-use concerns enterprises because if a non-enterprise site is breached, an association may be made between a user name, or email address, and password credentials obtained in the breach. If the password credentials have also been used for an enterprise service, e.g., a single sign-on, an enterprise access, or a third-party SaaS (Software as a Service) used by the enterprise, the re-used password may be used to attach the enterprise.

Thus, it would be desirable to be able to detect and prevent password re-use.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various acts and operations described hereinafter may also be implemented in hardware.

In an embodiment, a method provides for identifying and authenticating a client that initiated a DNS query and provides information related to the domain (e.g., an assessment). The embodiment uses a single DNS query that includes authentication information and returns a single DNS response that includes both a resolved IP address and information related to the resolved IP address. For example, a user, by way of an application on a client, might attempt to access www.example.com.

FIG. 1 is a flow chart of a method 100 for resolving a domain name according to an embodiment. In FIG. 1, in step 102, a server receives a query initiated by a client device for a domain name system (DNS) resolution of a domain name. In step 104, the first server determines that it is authorized to process the query, or the first server determines that the sender of the query is authorized to access the first server. In step 106, the server begins to process the query. In step 108, the processing of the query includes the server obtaining a resolved internet protocol (IP) address for the domain name, e.g., by resolving the query itself or sending the query on for resolution. The processing also optionally includes the server evaluating any available classification data against a policy associated with the client device. For example, the server may search available databases for classification data. However, the server may request that a third-party service provide any available classification data, or may provide the policy to a third-party service and request the third-party service perform the evaluation. The server, may also simply provide any available classification data to the client without evaluation. And the server may also provide only an IP address. In step 110, when an evaluation results in a determination that the client device is not allowed to access the IP address, the server provides a DNS response that either substitutes a blocking IP address for the resolved IP address or includes a DNS RCODE (Response Code) which indicates that the requestor will not receive an IP address, such as the NXDOMAIN Response Code, which indicates that the domain name does not exist. Responding with NXDOMAIN for a domain that does exist but which the client device is not allowed to access will prevent the client device from being able to access the domain. In step 112, when an evaluation results in a determination that the client device is allowed to access the IP address, or is indeterminant, or is not performed, the server provides a DNS response that includes the resolved IP address and the available classification data. In an embodiment, there may also be a collection of user preferences regarding whether different classifications should be blocked. These user preferences may additionally be used in a conservative manner to support additional blocking but not to reverse a blocking decision from an enterprise policy. E.g., the enterprise policy may not include a policy to block offensive content (or any other particular one or more classifications), but the user has expressed a preference to block that classification. In that instance, the user preference will result in offensive content being blocked at the client device. But the user preference cannot be used to reverse a decision from enterprise policy that indicated the URL or domain should be blocked; the enterprise policy blocking decision has priority.

Figure 2:
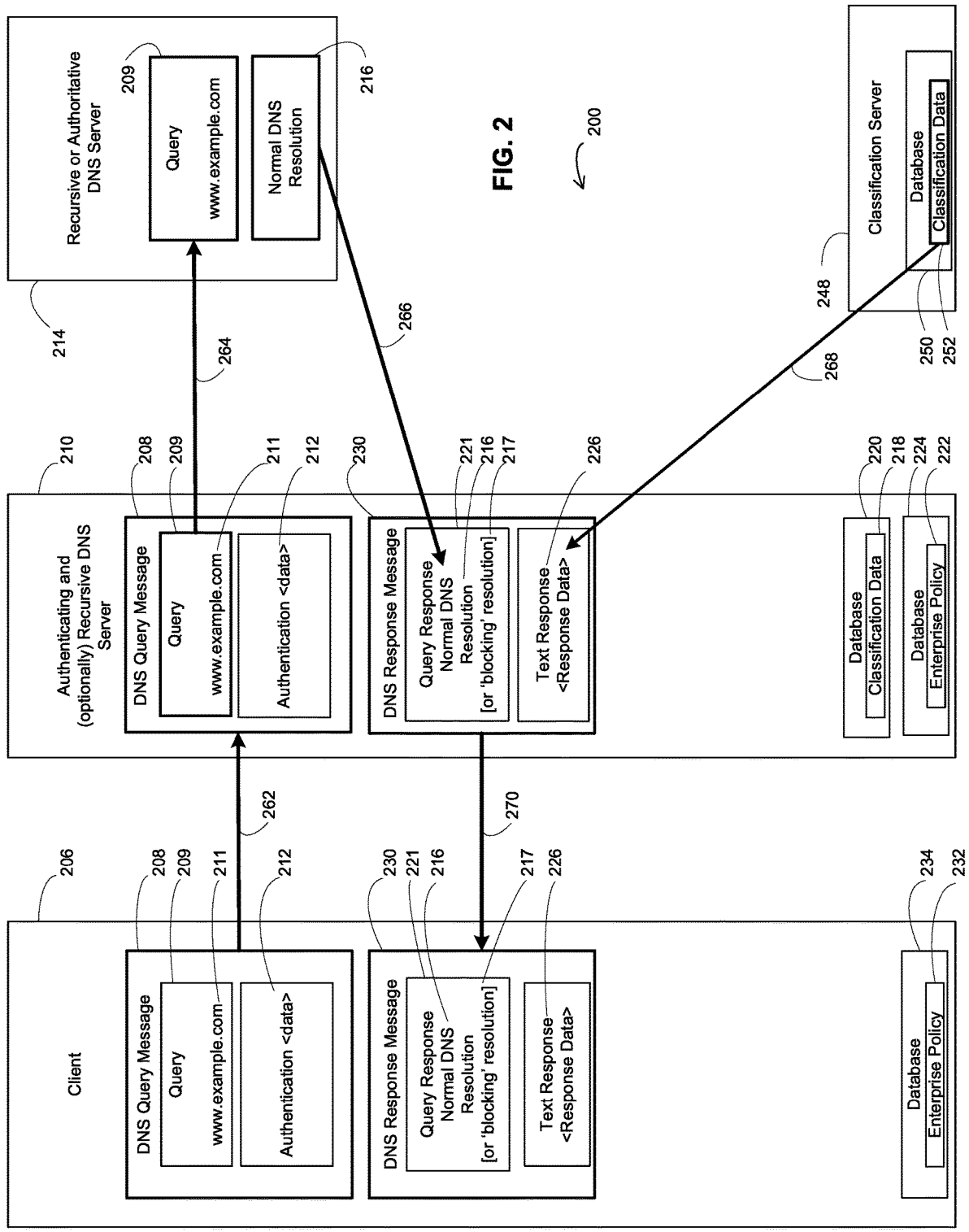
FIG. 2 is an exemplary block diagram of a system and method for resolving a domain name according to an embodiment.

FIG. 2 is an exemplary block diagram of an embodiment of a system 200 for resolving a domain name. In FIG. 2, a client 206 may create a DNS query 209 for a domain name 211 (e.g., www.example.com) and transmit 262 a DNS query message 208 to an authentication server 210. When creating the DNS query message 208, client 206 may include authentication data 212 in query message 208. On receiving DNS query message 208, server 210 may use authentication data 212 to authenticate client 206 and may resolve DNS query 209, creating a query response 221 with a normal DNS resolution 216. Optionally, server 210 may transmit 264 query 209 to a server 214 to be resolved and receive 266 normal resolution 216 from server 214. After providing or receiving the resolved IP address 216 (the normal DNS resolution), server 210 may retrieve information or classification data 218 related to the IP address 216 from a classification database 220 on server 210. Optionally, server 210 may retrieve 268 information or classification data 252 from a classification database 250 on a classification server 248. The retrieved information 218, 252 may be compared at server 210 to an enterprise policy 222 associated with the client in a policy database 224 to determine whether client 206 should be allowed to access IP address 216. The retrieved information 218, 252 may be included as response data in a text response 226 that is itself part of a DNS response message 230. In an embodiment, instead of using a text response 226 the retrieved information 218, 252 may be included in a different type of resource record than text (TXT), or in an EDNS(0) extension. Thus, the text response 226 also represents the different type of resource record or EDNS(0) extension payload. When the comparison of retrieved information 218 or 252 to enterprise policy 222 indicates that IP address 216 should be blocked, DNS response message 230 may, in query response 221, include a resolution of IP address 211 as a different, "blocking" address 217 that prevents accessing the resolved IP address 216, or includes a DNS RCODE (Response Code) which indicates that the requestor will not receive an IP address, such as the NXDOMAIN Response Code, which indicates that the domain name does not exist. However, if the comparison at server 210 of the retrieved information to the policy is agnostic regarding whether to block IP address 216, the retrieved information 218 or 252 may be included as response data in text response 226 within DNS response message 230, or may be included in a different type of resource record than text (TXT), or in an EDNS(0) extension. Following transmission 270 of DNS response message 230 to client 206, the retrieved information may be compared against an enterprise policy 232 in a client enterprise policy database 234 to determine whether to allow client 206 to access resolve IP address 216.

Figure 3:
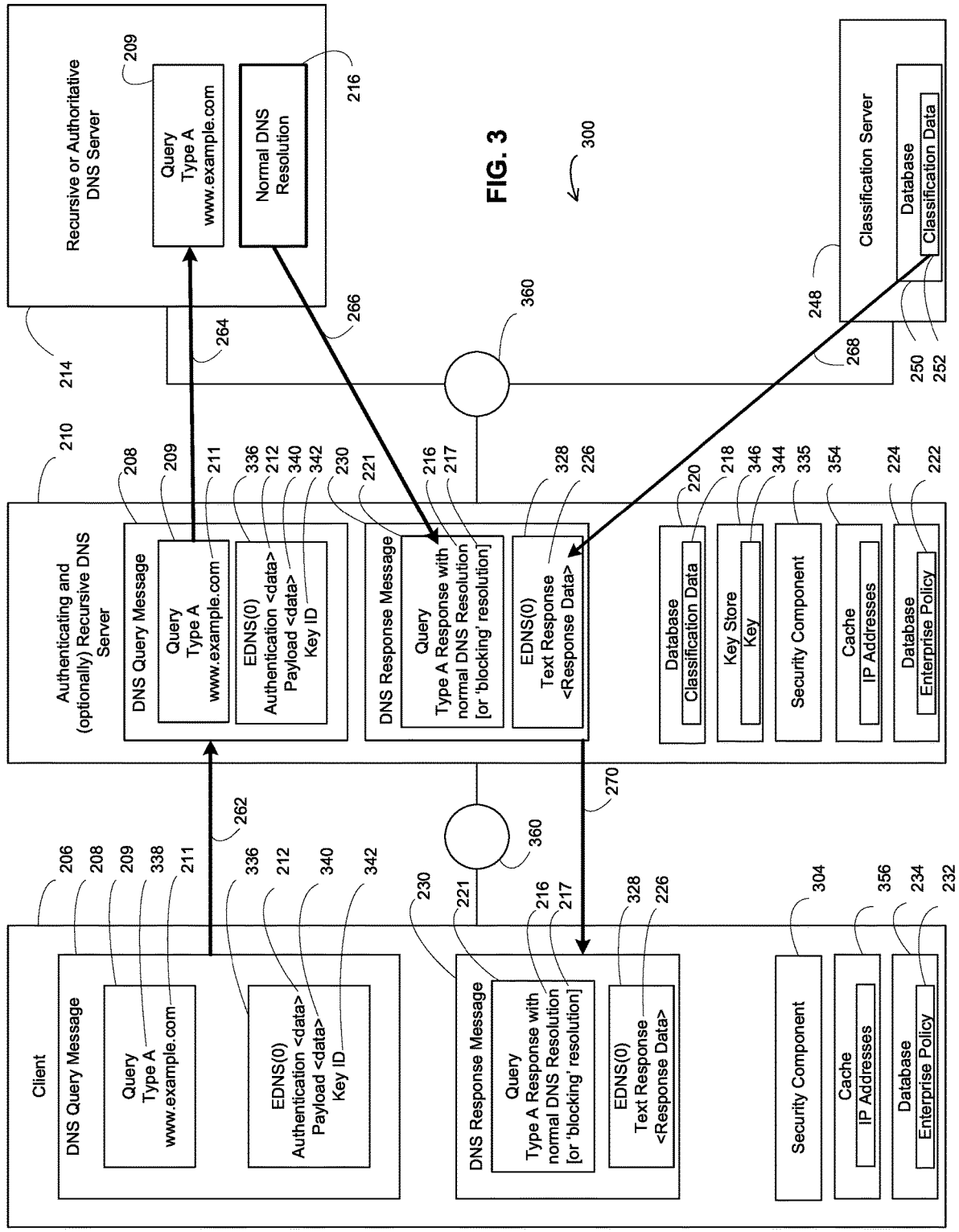
FIG. 3 is an exemplary block diagram of a system and method for resolving a domain name according to an embodiment.

FIG. 3 is an exemplary block diagram of an embodiment of a system 300 for resolving a domain name. In an embodiment, client 206 may be an enterprise client and server 210 may be an enterprise server. In the embodiment, a security component 304 may combine authentication data 212, which may also include payload data 340 and a key ID 342, with original query 209 using DNS extensions 336 to associate authentication data 212, payload data 340, and key ID 342 with DNS query 209. Since DNS protocol does not provide an authentication mechanism, security component 304 is an example of software required at both ends of the conversation to understand how such information is being encapsulated into the DNS message flows. The key ID can be used to determine whether the DNS request can be resolved by a specific DNS server or to a specific set addresses (e.g., addresses only available to a specific enterprise). In at least one embodiment, the key can be used not only for authentication but also to identify the policies or enterprise with which the request is associated. For example, if enterprise group A is associated with key Z, and enterprise group B is associated with key X then a request associated with key Z can be identified as being associated with enterprise group A.

Extension mechanisms for DNS (EDNS(0)) are provided for in the Internet Engineering Task Force (IETF) Request for Comment (RFC) 6891. Using EDNS(0), the embodiment associates authentication data 212, payload data 340, and key ID 342, with DNS query 209 in DNS query message 208 using EDNS(0) options 336. EDNS(0) can be used to permit larger response capabilities.

With DNS query message 208 remaining within the enterprise's system, there is no third-party code and, as a result, no requirement to register which extension code is used by the method—because the enterprise is both the sender and the only receiver of the query. In addition, a security component 335 on server 210 may block any query 208 that does not include the correct option set. In the embodiment, experimental extension codes in EDNS(0) may be chosen so that if DNS query message 208 were to go to an unintended, non-enterprise server the query would be ignored. In addition, in the embodiment, DNS query message 208 may be sent using a communication protocol (for example, Transmission Control Protocol (TCP), User Datagram Protocol (UDP), etc.).

In an embodiment, DNS query message 208 may not remain within the enterprise's system, as a result the embodiment includes registering the extension code(s) used by the method.

An exemplary authentication protocol is the Hardware Machine Authentication Code (HMAC). In the embodiment, HMAC may be used to authenticate client 206 sending DNS query message 208 containing a query type 338 (e.g., Type A, although any other RR Type such as AAAA could be used) and domain name 211 (e.g., www.example.com). According to the HMAC protocol, payload data 340 is generated by a client security component 304. Authentication data 212 (a signature) is generated from payload data 340 by security component 304 using a key (not shown). According to the embodiment, payload data 340, authentication data 212, and key ID 342 are associated with DNS query 209 using EDNS(0) options 336, placing authentication data 212 in one EDNS(0) option, payload data 340 in a second EDNS(0) option, and key ID 342 in a third EDNS(0) option. To clarify, while the structures of the EDNS(0) options 336 are defined by RFC 6891, the contents placed in within each option according to the embodiment are not defined by RFC 6891.

Upon receipt of DNS query message 208 by authenticating server 210 and according to the HMAC protocol, security component 335 may use key ID 342 to retrieve a key 344 from a key store 346. Security component 335 may then use key 344 to create new authentication data (a new signature, not shown) from payload data 340. Client 206 is authenticated if security component 335 compares the new signature to the original signature 212 and the signatures match.

Additional embodiments may employ the EDNS(0) options to contain authentication credentials that are appropriate for authentication protocols other than HMAC.

With client 206 authenticated, security component 335 may proceed to resolve DNS query 209 and retrieve information or classification data 218 or 252 related to resolved IP address 216. In the embodiment, server 210 may itself be a recursive resolver or it may forward the query to a recursive resolver server 214. Thus, in an embodiment, there may be two servers 210, the first of which does authentication (and perhaps other functions, such as load balancing), the second of which is a recursive resolver server or may use yet another recursive resolver, wherein DNS traffic is sent between the two servers 210. Upon receipt of the resolved IP address 216, security component 335 sends a DNS response message 230 to client 206, augmenting the response message with information or classification data 218 or 252 regarding the resolved IP address in text record with response data 226 that is included in an EDNS(0) option 328. In the embodiment, original query 209 may be included in the DNS response message as is usual in a normal DNS response.

An advantage of various embodiments is that the response to the original query includes the resolved IP address as well as, in the same message, the classification data and/or enterprise policy (e.g., in the EDNS(0) extensions), and the classification data may include data from multiple sources. The inclusion of both in the same response saves in network performance versus having to make separate requests for both the resolved IP address and the classification data and policy. An additional advantage of various embodiments results from the server interpreting a request for a single type query as including a request for other types of queries for the same domain. Thus, if the requested type of address is not available the client receives a different type of address and need not send a second DNS query.

In an embodiment, response data 226 in the EDNS(0) option 328 may include classification data 218 or 252 that security component 335 retrieved from a classification data database 224 or 250 upon resolving or receiving the resolved IP address 216. Client 206, upon receiving the DNS response message 230 with the text record 226, may compare, using security component 304, the classification data against one or more enterprise policies 232 from a client enterprise policy database 234. The comparison may result in a determination that one or more of the enterprise policies prevents client 206 from continuing with a communication to the resolved IP address 216. The comparison may result in a determination that one or more of the enterprise policies advises against client 206 from continuing with a communication to the resolved IP address 216, while providing an option of continuing with a communication. And the comparison may result in a determination that client 206 may proceed with a communication to the resolved IP address 216. Thus, in embodiments, after sending a single DNS query message 208, client 206 may receive both a resolved IP address 216 and actionable information in response data 226 regarding IP address 211 in a single DNS response message 230.

In an embodiment, the response data 226 may include a command that is implemented by security component 304. The command may be generated by a security component 335 in server 210 after the security component retrieved the classification data 218 or 252 from classification data database 220 or 250 and compared the classification data against one or more enterprise policies 222 from a policy database 224. The comparison may result in a determination that one or more of the enterprise policies 222 prevents client 206 from continuing with a communication to resolved IP address 216. The comparison may result in a determination that one or more of the enterprise policies advises against client 206 from continuing with a communication to resolved IP address 216, while providing an option of continuing with a communication. And the comparison may result in a determination that client 206 may proceed with a communication to resolved IP address 216. Security component 335 may include in the text record 226 a command that is based on one of the determinations, e.g.: do not communicate with the resolved IP address; communicating with the resolved IP address is advised against but is optional (perhaps providing the user with an option); and communication with the resolved IP address is allowed. Thus, in embodiments, after sending a single DNS query message 208, client 206 may receive both a resolved IP address 216 and a command controlling subsequent actions to be taken regarding the IP address in a single DNS response message 230.

While EDNS(0) uses convenient protocol data units (PDUs), in embodiments, other protocols or custom code may be used to combine the initial DNS query with authentication information, and to combine the resolved IP address with the text record in a DNS response message.

In the embodiment of FIG. 3, DNS Query 209 is shown to request a Type A response 338, which returns an IPV4 address for the domain of interest. The use of "Type A" is merely exemplary and the query could include any of the various types of DNS requests, e.g., Type AAAA, or CNAME.

In an embodiment, the authentication of client 206 may be performed as follows. Client 206 is provided a key (not shown) and security component 304 creates payload data 340. Using the key, security component 304 takes a hash of payload data 340 to create authentication data 212 (a signature). Security component 304 then combines authentication data 212, payload data 340, and key ID 342 (designating the key used to create the signature) within DNS query message 208, each within its own ENDS(0) option 336. Security component 304 then forwards DNS query message 208 to server 210. Note that in embodiments using HMAC, payload data 340 is not encrypted. Rather payload data 340 is sent alongside authentication data 212 (the HMAC hash made using the key). Server 210 uses key ID 342 to retrieve a key 344 from a key store 346. Server 210 then takes a hash of payload data 340 using retrieved key 344, creating new authentication data (a new signature, not shown). The server then compares the new signature to the received signature. When the signatures match, client 206 is authenticated.

In an embodiment, enterprise policy 232 may be implemented on client 206 by configuring client 206 to respond to response data 218 or 252 according to the policy. For example, enterprise policy 232 may be to block certain categories (e.g., phishing, offensive, etc.). The websites can be associated with website categories (e.g., advertising, news, phishing, offensive). For example, an enterprise policy can indicate that phishing categories should be blocked, so when the enterprise policy is applied the website that are associated with phishing will be blocked for users/devices associated with said enterprise.

In the embodiment of FIG. 3, at authenticating server 210, if communication with resolved IP address 216 is unauthorized after the comparison of characterization data 218, 252 to one or more enterprise policies 222, then resolved IP address 216 may be replaced with a different, "blocking" IP address 217 that prevents accessing resolved IP address 216, and no classification data is included in the text response 226, the server can provide a DNS response that either substitutes a blocking IP address for the resolved IP address or include a DNS RCODE (Response Code) which indicates that the requestor will not receive an IP address, such as the NXDOMAIN Response Code, which indicates that the domain name does not exist. Responding with NXDOMAIN for a domain that does exist but which the client device is not allowed to access will prevent the client device from being able to access the domain. In an embodiment, the key associated with a DNS request can be used to determine the enterprise policy associated with the request, based on the enterprise policy a determination can be made whether to block an IP address, or resolve an IP address. For example, enterprise policy A can be associated with key Z so when a request is made by a user and it is determined that the request is associated with key Z, it can be determined that the request is associated with enterprise policy A. Based on the determination that the request is associated with enterprise policy A, the request can be resolved or blocked.

In embodiments, the classification data for a resolved IP address may be included in a classification data database on server 210, on resolving server 214, on classification server 248, and on client 206.

In embodiments, the classification data for a resolved IP address may be provided, in response to a request from server 210, by a third-party service to server 210 after the third-party service accesses its own classification data database. In embodiments, there may be multiple sources of classification data, e.g., from the primary vendor of the DNS plus classification service, from the enterprise using such a service, or from one or more third-party services. In such a case the classification server 248 may map all classification results to a single classification taxonomy from the individual and different classification taxonomies used by the other sources of classification data. In some cases, there may be a disagreement amongst the different sources of classification data as to the classification of a particular domain or URL. In such an instance the classification server 248 chooses which classification to use by various methods. The classification server 248 may choose to allow classifications from an enterprise source to override other classifications. The Classification Server 248 may choose to employ a voting system to use the most frequent classification among the classification sources. The Classification Server 248 may choose to use the most conservative classification among the classification sources; e.g., if only one of the several sources of classification data indicate that a particular domain or URL is classified as "Phishing," then the "Phishing" classification will be used to safeguard requesting clients. The Classification Server 248 may choose to use the most recent classification data from the several sources of classification data. Additionally, when the Classification Server 248 sees such a conflict or disagreement amongst the different sources of classification data, it may initiate a real-time or scheduled security or content analysis of the domain or URL in question. The security or content analysis may determine an updated classification, which will be used by the Classification Server 248. In an embodiment, the choice of how the Classification Server 248 resolves conflicts or disagreements is determined by an enterprise policy.

In embodiments, authenticating server 210 may optionally be a recursive DNS server. Recursive server 210 may review a cache 354 for the resolved IP address in resolving query 209. Similarly, client 206 may review its own cache 356 before sending DNS query message 208. Each such cache may include resolved IP addresses, where the duration that such addresses are accessible being determined by a Time To Live value (TTL, e.g., FIG. 6, elements 632, 634) that is returned in a DNS response.

In embodiments, client 206 may be any of: a mobile communications device, a laptop, any computing device from which a user may browse a network, a smart speaker, a 'thing' in the Internet of Things, and system components between such devices and server 210, such as a router. Client 206, server 210, server 214, and server 248 may be connected by network connections 360. Options for client 206 and network connections 360 are discussed further within regarding FIG. 11 and FIG. 12.

Figure 4:
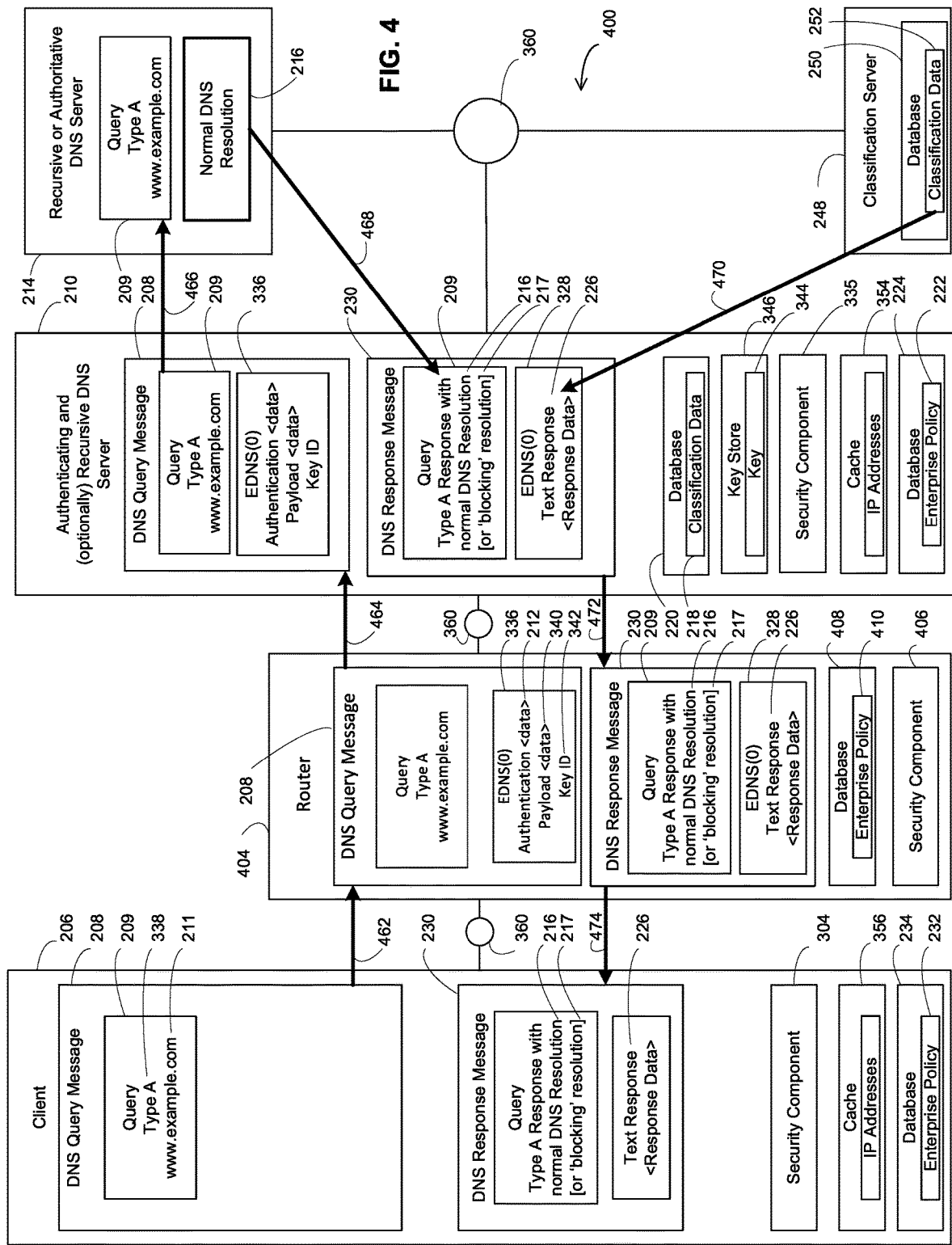
FIG. 4 is an exemplary block diagram of a system and method for resolving a domain name according to an embodiment.

FIG. 4 is an exemplary block diagram of a system 400 for resolving a domain name according to an embodiment. In FIG. 4, a security component 206 on a router 204 uses EDNS(0) options 336 to combine the authentication information (e.g., authentication data 212 payload data 340, and key ID 342, where HMAC is being used) with original DNS query 209. In FIG. 4, the embodiment is described regarding router 404. However, router 404 is exemplary of any of a number of network devices that may receive DNS query message 208 from client 206 and modify the query message according to the embodiment. In other embodiments, router 404 may be replaced by, e.g., a hub, switch, bridge, gateway, modem, repeater, or access point.

In the embodiment of FIG. 4, many system components and method elements are the same as or similar to elements discussed with regard to FIG. 1 through FIG. 3. For convenience, like reference numbers refer to the same element in the various figures. In FIG. 4, client 206 addresses DNS query message 208 to server 210. In contrast to FIG. 3, client 206 does not add information to EDNS(0) options. En route to server 210, DNS query message 208 is received 462 by router 404 in which a security component 406 creates authentication data 212 (a signature) by taking a hash of payload data 340 using a key. Router security component 406 then combines authentication data (a signature), the payload data, and the key ID with the DNS query message using EDNS(0) 336 options as discussed earlier. In an embodiment, the router adds the payload to the request sent from a client. For example, a client (e.g., device in a home office) can transmit a request to a router in a remote location (e.g., enterprise office), the router can add a payload to the request allowing to client to resolve IP addresses that are associated with the enterprise office. The embodiment may be used, e.g., when the client sends an unencrypted DNS request using UDP, or when router 404 has been provisioned with a certificate that allows it to man-in-the-middle the DNS message flow (if encrypted).

Transmission 464 sends DNS query message 208 to server 210, which proceeds as discussed earlier to resolve IP address 211 (internally or via communications 466, 468 with DNS server 214), acquire classification data 218 or 252 (via communication 470 with server 248), and include resolved IP address 216 and the classification data within DNS response message 230. Server 210 transmits 472 DNS response message 230 to router 404 by security component 335. In router 404, security component 406 may have authority to make decisions for client 206 based on the classification data 218 or 252 received from the server 210. Router 404 may also access a router classification data database (not shown) or classification database 250 on server 248. Security component 406 may then compare the classification data against an enterprise policy 410 for client 206 retrieved by router 404 from database 408. When the comparison shows the classification data to meet the enterprise policy, or the comparison is agnostic or otherwise indeterminant, router 404 forwards 474 DNS response message 230 to client 206. In an embodiment, security component 406 may forward 474 DNS response message 230 to client 206 without security component 406 having compared classification data 218 or 252 against any enterprise policy 410 or otherwise modifying DNS response message 230. In such an embodiment, security component 304, upon client 206 receiving DNS response message 230, may compare response data 226 against one or more enterprise policies 232 and implement the required action as described earlier with regard to FIG. 1 through FIG. 3.

In various embodiments, server 210 may receive DNS query messages from clients of more than one enterprise. In such embodiments, part of the authentication procedure at server 210 associates the sending client 206 with a particular enterprise. Thus, in the embodiments, the databases of enterprise policies 408 may include policies from more than one enterprise. In such an embodiment, additional steps in the method performed at server 210 include: associating client 206 with a particular enterprise; and comparing the classification data of the resolved IP address to only those policies that are associated with the particular enterprise.

In embodiments, the DNS query message may only need to go to a recursive resolver, which then processes the query accordingly. In other words, there is no requirement that the query go to the root server, the TLD server, and then to the authoritative server, because there may be cache entries at the DNS recursive resolver that eliminate the need to perform those additional queries to the root server, the TLD server, or even the authoritative server.

While embodiments may be discussed as using TCP to send the DNS query message, the use of TCP in the various embodiments is exemplary. Embodiments may also send DNS queries over TLS (DOT: DNS over TLS) or HTTPS (DOH: DNS over HTTPS) or DNS over Datagram Transport Layer Security (DTLS) or DNS over UDP. From the standpoint of the methods discussed, they could be implemented using any of the protocols. DNS over TCP, while reliable, does experience a slight performance drop in comparison to the other protocols because setting up the TCP connection requires a few exchanges, among other things.

For example, in an embodiment, DOT (DNS over TLS) may be used as the connection protocol. In the embodiment, performance may be improved by keeping the DOT connection open. Furthermore, when there is one DNS resolution in a browsing scenario, that resolution is typically followed by significantly more. For example, a typical web page may include 20 or more trackers, things such as scripts or images from different domains, and those additional addresses require resolution. So, when the first domain name is resolved, if the TLS connection is kept open, the subsequent resolutions may proceed without duplicating the creation of a TLS connection. In other words, the resolution process could be repeated on the open TLS connection.

In more detail, if an e-mail contains a link to a website, when that link is selected, and the mail client opens up a browser for that URL, the browser sees the whole path URL. The browser takes the domain and performs a DNS resolution to determine the IP address to connect to. With the IP address the browser makes the HTTP connection to the IP address. The HTTP server responds with an HTML response—an HTML web page. Such a web page typically includes a significant number of additional URLs. It may include URLs our of image tags, ULRs for style sheets (e.g., CSS), URLs for scripts, and the scripts themselves may generate other URLs. The use of DNS pre-fetch may result in a browser obtaining DNS resolution of URLs before they are required by the user activities, e.g., clicking on a link. In other words, an incredible amount of DNS traffic may be created by accessing just one web page. Thus, if the TLS connection is kept open, and the subsequent resolutions may proceed without duplicating the creation of a TLS connection, this results in a significant performance enhancement.

Figure 5:
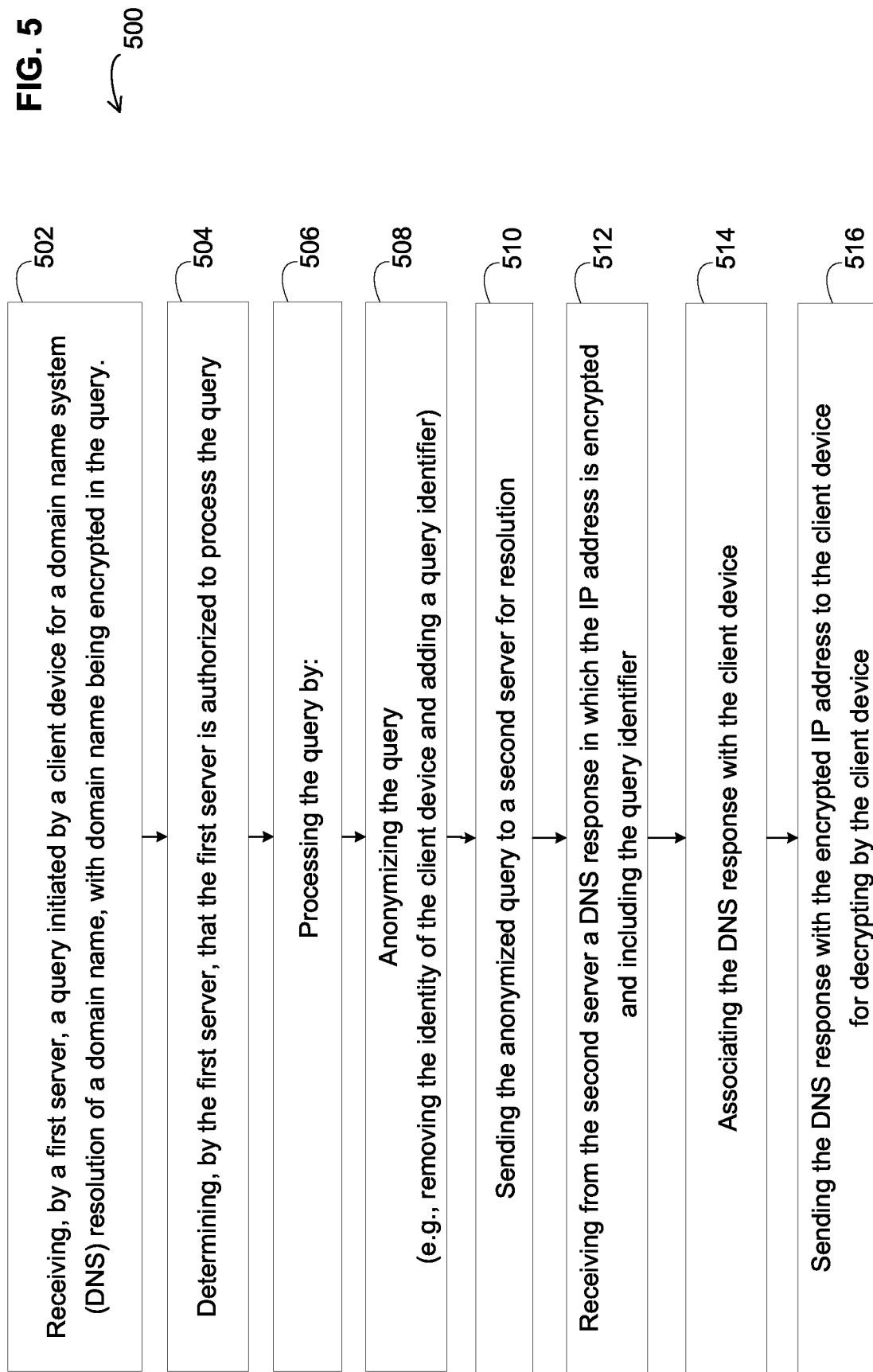
FIG. 5 is a flow chart of a method for preserving privacy while resolving a domain name according to an embodiment.

FIG. 5 is a flow chart of a method 500 for preserving privacy while resolving a domain name according to an embodiment. In FIG. 5, in step 502, a first server receives a query initiated by a client device for a domain name system (DNS) resolution of a domain name, with domain name being encrypted in the query. In step 504, the first server determines that the first server is authorized to process the query, or the first server determines that the sender of the query is authorized to access the first server. In step 506, the server begins to process the query. In step 508, the server anonymizes the query, e.g., by removing the identity of the client device and adding a query identifier. In other words the server disguises the source of the query. In step 510, the server sends the anonymized query to a second server for resolution, where the second server may be, e.g., a recursive server. In step 512, the first server receives from the second server a DNS response with the query identifier and an IP address that is encrypted. Thus, the first server does not know the domain name or the corresponding resolved IP address in either the initial query or the subsequent DNS response. In step 514, the first server associates the DNS response with the client device, e.g., using the query identifier. And in step 516, the first server sends the DNS response with the encrypted IP address to the client device for decrypting by the client device. In the processing of the query, method 500 optionally includes the following optional steps. The second server may retrieve and evaluate available classification data against a policy representation associated with the client device. For example, the second server may receive a representation of a policy associated with the client device from the first server in the anonymized query. The second server may then search available databases for classification data. However, the second server may optionally request that a third-party service provide any available classification data, or may provide the policy representation to a third-party service and request the third-party service perform the evaluation. The second server may also simply provide any available classification data to the client without evaluation. And the second server may also provide only an encrypted IP address. In an additional optional step, when an evaluation results in a determination that the client device is not allowed to access the IP address, the second server may provide an encrypted DNS response that substitutes a blocking IP address for the resolved IP address or includes a DNS Response Code of NXDOMAIN. In an additional optional step, when an evaluation results in a determination that the client device is allowed to access the IP address, or is indeterminant, or is not performed, the second server may provide an encrypted DNS response that includes the resolved IP address and the available classification data.

Figure 6:
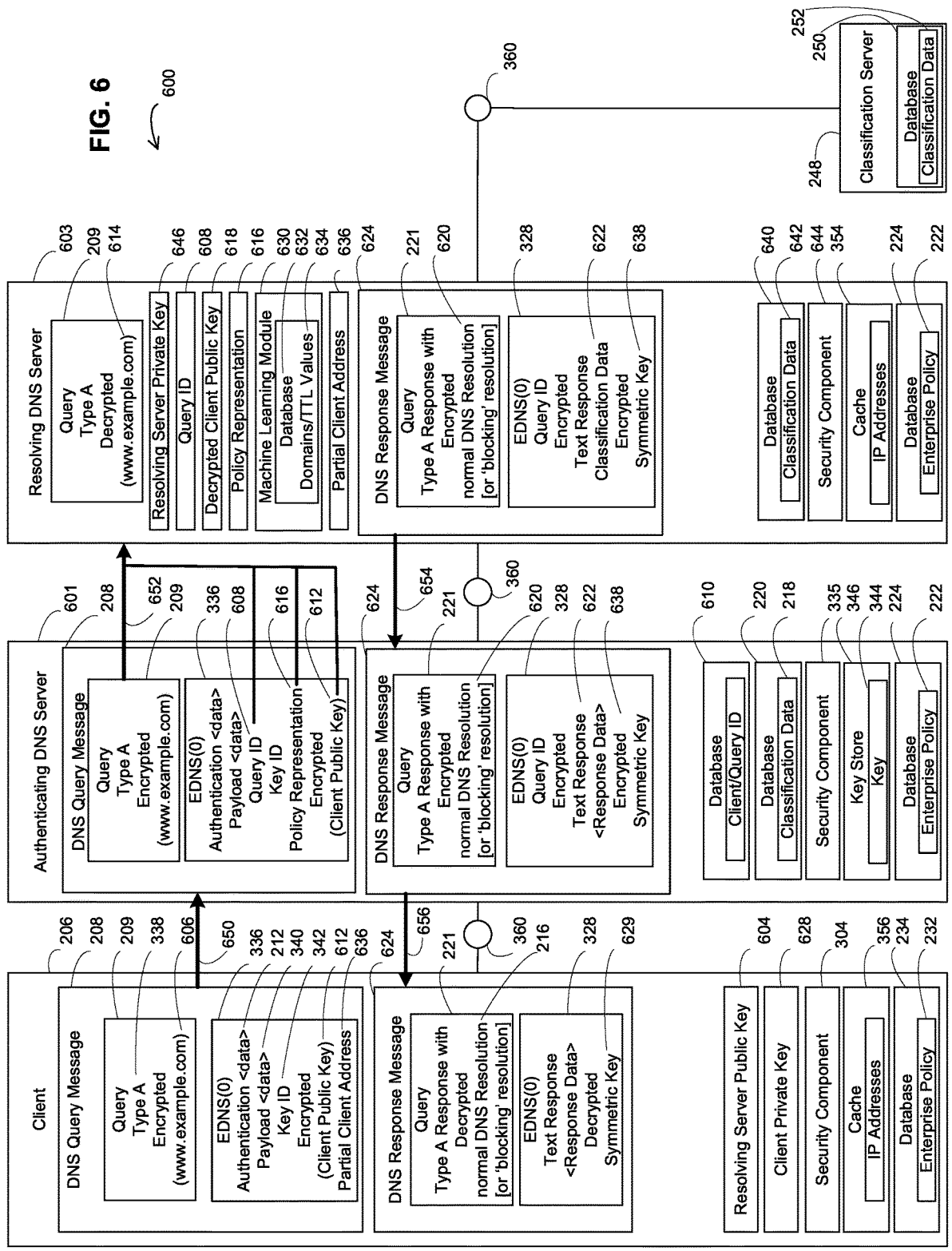
FIG. 6 is an exemplary block diagram of a system and method for preserving privacy while resolving a domain name according to an embodiment.

FIG. 6 is an exemplary block diagram of a system 600 for preserving privacy while resolving a domain name according to an embodiment. In FIG. 6, a client 206 may initiate DNS query 208 and receive DNS resolution 216 without any server involved in the resolution having an association of client 206 with DNS query 209. In other words, client 206's browsing history remains private because the system and method divorce the knowledge of the client identity from the knowledge of the domain that is the subject of the DNS query.

In the embodiment of FIG. 6, when client 206 sends a DNS query 209, security component 304 substitutes an encrypted domain 606. For example, security component 304 may use a public key 604 of a resolving server 603 to encrypt the domain that is the subject of query 209. Security component 304 may also include authentication information along with the query. For example, security component 304 may use EDNS(0) options as discussed earlier. Security component 304 may then send 650 query 209 to an authenticating server 601. With the domain encrypted and without the resolving server public key, server 601 cannot know what domain is being resolved. Server 601, however, may perform the authentication as discussed earlier. Based on the authentication and identity of client 206, server 601 also performs a determination of what enterprise policy is to be applied to the eventually-resolved IP address by accessing database 224. Server 601 includes, in DNS query message 208, a representation 616 of the determined enterprise policy or policies 222. Server 601 also includes, in the DNS query, a query identifier (query ID) 608 that server 601 has associated with client 206 (but which, outside of server 601, may not necessarily be used to identify client 206). Query ID 608 may be an arbitrary label that server 601 creates and associates with client 206 and the particular query 209. Representation 616 of the policy may be, for example, a policy identifier that resolving server 603 could use to retrieve a policy 222 from a policy database 224. Or, representation 616 could be more detailed, such as a listing of categories of allowed or blocked IP addresses. Server 601 then forwards 652 the DNS query message 209 with encrypted domain 606 to server 603 along with an encrypted client public key 612 (for later use by server 603), policy representation 616, and query ID 608.

Server 603 authenticates the response as originating from server 601, but does not authenticate client 206, having only query ID 608 to identify the client. Server 603 decrypts query 209 and determines decrypted domain 614 is to be resolved. Thus, neither server 601 nor server 603 has both client 206 identity and decrypted domain name 614—no single server has that private information. Server 603 then proceeds to resolve the query as discussed earlier, which returns, e.g., the IPV4 address of the domain for a Type A query. Additionally, server 603, upon resolving the IP address, may use representation 616 of the policy to retrieve the classification data 218 or 252, as discussed previously. Server 603 encrypts a resolved IP address 620 using decrypted client public key 618. Server 603 also encrypts classification data 622 included, e.g., in the text response data of EDNS(0) options 328. Server 603 includes query ID 608 in DNS response message 624 and transmits 654 message 624 to server 601.

On receipt of DNS response message 624, server 601 uses query ID 608 included in the response message to determine the identity of client 206 to which response message 624 should be sent. With the DNS resolution within the DNS response message being encrypted 620 and with the response data of the text response also being encrypted 622, server 601 does not know the resolved IP address. Nor does server 601 know the classification data associated with the resolved IP address. Thus, server 601 still does not know decrypted domain 614 was the subject of the query. And server 601 does not have access to encrypted classification data 622, which may be used to identify the nature of the domain, if not the actual domain.

In an embodiment, server 601 may maintain query ID 608 in a database 610 associated with the IP address of client 206, query 209, and other information such as an identifier of a network connection with the client and an identifier of a network connection with server 603. With query ID 608 included in the DNS response message by server 603, server 601 may retrieve the associated client (client 206) from database 610. The process is similar to NAT forwarding, except in this case privacy is preserved. Server 601 then transmits 656 DNS response message 624 to client 206 (without including query ID 608).

When client 206 receives DNS response message 624, security component 304 may use a client private key 628 to decrypt resolved IP address 620 and response data 622 in the text response.

With regard to FIG. 6, in the embodiment, client security component 304 initially encrypts domain 606 and client public key 612 using public key 604 of resolving server 603. In the embodiment, client 206 obtains public key 612 after connecting to server 601 and being informed by server 601 that server 603 is the DNS resolve to which server 601 directs DNS queries. Server 601 may then furnish client 206 with server 603's certificate, with server 603's public key directly, or with server 603's domain name or other identifier. Client 206 may then fetch a certificate and obtain server 603's public key.

In an embodiment, instead of using public key cryptography for every DNS query, the first time server 603 receives a DNS query, server 603 generates and encrypts (using client public key 618) a symmetric key 638 and includes that key in the EDNS(0) options 328. Subsequent DNS queries from client 206 may then use symmetric key 629 to encrypt the query data destined for server 603. The subsequent use of symmetric key cryptography will speed up the DNS resolution process between client 206 and server 603 since symmetric key cryptography is significantly faster than public key cryptography. By analogy, the use of symmetric key cryptography between server 603 and the client is similar to performing a TLS handshake between server 603 and the client through server 601. The client 206 and the server 603 can perform a process such as a Diffie-Hellman key exchange communicating through server 601 to establish the symmetric key that will be used. In the embodiment, at no time does a single server know both the client identity and the destination domain. In an embodiment the client 206 and the server 603 may establish a different symmetric key at a later time, so that the symmetric key itself cannot be used to perform long term browser history tracking. In an embodiment that uses public key cryptography for every DNS query, the client 206 may provide a different public key in its transmission.

Still regarding FIG. 6. In embodiments, the privacy-preserving DNS proxies—server 601 and server 603—could be in the same data center in the cloud, or could be separated. Also, server 601 and server 603 need not be operated by the same entity. However, the use of privacy-preserving servers 601, 603 and the additional communications may slow down the DNS resolution process.

In some embodiments, to reduce any negative impact on performance of using privacy-preserving servers 601, 603, knowledge of what the client may request next may be used to anticipate the next client request and, as a result, speed up the resolution process.

In one such embodiment using privacy-preserving servers 601, 603, server 603 interprets a Type AAAA query (a request for an IPV6 address) as both a Type AAAA query and a Type A query (a request for an IPV4 address) for the same domain. Thus, if an IPV6 address is not available, the client has the IPV4 address and need not send a second DNS query.

In a second such embodiment using privacy-preserving servers, server 603 may have a machine learning module 630 that is trained by DNS query data. Server 603 may employ machine learning module 630 to predict, using an initial DNS query 209, what subsequent DNS queries may follow. With regard to FIG. 6, an embodiment of a system and method for preserving client privacy in a DNS resolution may employ machine learning module 630. In the embodiment, query ID 608 may also include an associated session identifier (also stored in the query identifier database 610 of server 601), which may be used by server 603 to determine that multiple queries are associated with a single browsing session. The session identifier may allow server 603 to identify multiple destinations that are typically resolved after an initial DNS query and during the same session as the initial DNS query. For example, machine learning module 630 may determine that when www.example.com is an initial DNS query, 95% of the time a certain set of other domains are the subject of DNS queries during the same session. As a result, machine learning module 630, upon the resolution of a domain from an initial DNS query message, may query a database developed by machine learning module 630. Machine learning module 630 may determine that there is a set of associated domains, the resolution of which is usually requested following the initial DNS query. Machine learning module 630 may then direct security component 644 to include in DNS response message 624, along with encrypted IP address 620 of the initial domain, the encrypted IP addresses for each of the set of associated domains in one or more EDNS(0) options. The ability of the embodiment to pre-fetch a set of predicted IP addresses based on an initial IP address may be a significant time-saver and performance enhancement. In an embodiment, the use of the machine learning module 630 to supply multiple DNS resolutions and associated classifications may be implemented independently of the use of privacy preserving servers.

In a third such embodiment, machine learning module 630, receiving the Time-to-Live (TTL) value for resolved IP address 620, may add that IP address and associated TTL value to a database 632 of resolved domain IP addresses and the TTL values 634 provided along with the resolution. The provided TTL value indicates how long the resolved IP address is to live in the client's cache. From the data received from multiple resolutions, machine learning module 630 may add to database of provided TTL values 632, a TTL value that represents an effective TTL of the IP address, which may be considerably longer than the provided TTL. In other words, machine learning module 630 may determine that an IP address tends to be more stable than the provided TTL indicates. The difference between the provided TTL and the effective TTL may be due to a practice, which is becoming more common, in which a resolved IP address is given a TTL value that is unreasonably low. For example, TTL values of 6 and 12 seconds are becoming common. There is a benefit to web server operators associated with this practice—obsolete IP addresses time out of cache much faster, which allows for changes that web server operators make (such as moving a web server to a machine with a different IP address) propagate more quickly throughout the internet, but such changes are relatively infrequent thus these extremely low TTLs are unneeded in practice. But a negative effect of such low TTL values is that a resolved IP address ceases to exist in cache very quickly. As a result, there is likely to be a subsequent DNS query for that recently-expired IP address. Where machine learning module 630 receives a resolved IP address, it may consult its associated database 632 and determine that the effective TTL of the IP address is significantly longer than the provided TTL. Machine learning module 630 may then substitute the effective TTL, or a value for the TTL between the published TTL value and the determined effective TTL, for the provided TTL in DNS response message 624. Thus, resolved IP address 216 may remain in client cache 356 long enough to avoid one or more subsequent DNS queries for the domain. For example, where a provided TTL might be 6 seconds for www.example.com. If machine learning module 630 determines that an effective TTL is 1 minute, then upon resolving www.example.com, machine learning module 630 may change the TTL in the DNS response message to 1 minute. This substitution may eliminate 9 subsequent DNS requests to resolve www.example.com by the 64 second extension of the effective TTL. In some embodiments, the substitution may require server 601 convey to server 603 a pre-existing user permission or a policy that allows for the substitution, e.g., along with the policy data.

Furthermore, in an embodiment, longer TTL values may be substituted for the provided based on characteristics of the client device. For example, if a mobile communications device or a laptop is operating with a low battery, the substitution of a longer TTL for the provided TTL value could result in reducing the number of possible DNS queries sent by the device. In another example, a poor connection between the client device and the server may benefit from having to transmit fewer DNS queries, if longer TTL values are substituted.

FIG. 6 may be used to discuss a fourth such embodiment in which the EDNS client subnet (ECS) standard is used along with EDNS(0) to include some limited information about client 206 location in DNS query message 208 as it is sent from the client to server 601 to server 603. Because many websites use Content Delivery Networks (CDNs) there may be many different copies available of a website around the network. Without information regarding the location of client 206, server 603 may determine that there are a number of potential resolutions of the domain. As a result, server 603 may supply a resolved IP address that is less than optimally located with respect to client 206. For example, in the absence of ECS information in a DNS query, an authoritative resolver (or an intermediate recursive resolver), might choose a server which is close to the requesting recursive resolver, which may be very far from the actual client device itself. In contrast, with even limited client location information, server 603 may resolve a DNS query with the IP address that is nearest to the client, or at least nearer. In the embodiment, ECS may be used by security component 304 of client 206 to include a partial client IP address 636, unencrypted, in an EDNS(0) option 336 of DNS query message 208. For example, partial client IP address 636 may be the first 8 or 16 bits of an IPv4 address, which is equivalent to providing a general IP address neighborhood. With partial client IP address 636, server 603 may be better able to respond with the closest resolved IP address. Thus, in the embodiment, and, perhaps requiring user approval or an approving enterprise policy, client 206 includes ECS information in the original DNS query. The user preference or enterprise policy may allow ECS information to be used, or may prohibit ECS information from being used, or may allow a widened (less localized) ECS information to be used, or may separately specify such ECS policies differently for different domains, or a combination of the above. The operation of widening ECS information is the process of decreasing the size of the subnet value in the ECS information to represent a subnet that includes more IP addresses, thus reducing the ability for a receiver of ECS information to highly localize the client in a privacy invasive manner, which still retaining the benefit of being localized enough so that an optimal server can be chosen for DNS resolution. In an embodiment the widening process may involve reducing the subnet value by a fixed amount, or may use information about the geographic distribution of IP addresses to widen the ECS information (reduce the subnet value) so that the result still corresponds to the same general area, such as city or county, where the client IP address actually is. Where an enterprise policy 232 is controlling, that policy may prevent the inclusion of ECS information in the DNS query. In addition, the policy may allow the inclusion of ECS information from some clients but not for others, due perhaps to the location of a client as being associated with an enterprise server, with the result that divulging the ECS information for client 206 could lead to the association of the DNS query with the enterprise. Thus, user preference, enterprise policy, or both may be used to prevent or limit the sending of ECS information with DNS query message.

A benefit of embodiments in which the DNS query is encrypted and routed to server 603 is that the routing to server 603 prevents what is known as "DNS hi-jacking." DNS hi-jacking may be performed by Internet Service Providers (ISPs) or mobile network operators (MNOs) who collect and sell a user's browsing history. DNS hi-jacking occurs when the ISP or MNO discovers a DNS query on a network (traditional DNS queries are sent unencrypted and are easily observed and can be modified) and changes the query to direct it to a different, preferred DNS server. Embodiments prevent DNS hi-jacking because the communications are encrypted, e.g., DOT: DNS over TLS. In such embodiments, external actors (ISPs, MNOs) are not able to determine who the client is or the domain that is the subject of the DNS query until after the connection is actually made. As a result, the privacy of the client is enhanced.

In embodiments, a benefit of having resolved IP address 216 and classification data in the same DNS response message is that the classification data database may include the classification data associated with both domain name 614 and resolved IP address 216. This benefit applies to the various embodiments as discussed with regard to FIG. 1-FIG. 5. The benefit is that additional classification data may be generated based on associations formed by newly-resolved IP addresses. For example, an exemplary domain name may not be associated with any negative classification data. However, the resolved IP address for the exemplary domain name may be very similar to or the same as one or more other IP addresses for which there is substantial negative classification data. In such a situation, the substantial negative classification data may be imputed to the resolved IP address for the exemplary domain name based on the similarity of the resolved IP address. This might be considered a "transitive" classification scheme that imputes classification data based on the degree of similarity of IP addresses. Subsequently, an enterprise policy may determine whether or not the resolved IP address should be blocked or allowed based on an application of the policy to the imputed classification data. For example, suppose a client had previously visited "baddomain.com" and the resolved IP address was 1.2.3.4 with classification data stating, effectively: "This is not some place you want to go—this is a known malware site or phishing site." That resolution provides a link between the negative classification data of baddomain.com and IP address 1.2.3.4., and the link may be stored in classification database(s) 218, 250, 640. Subsequently, if a DNS query for "reasonable.com" returns the resolved IP address 1.2.3.4, even if there is no classification data for reasonable.com, security component 644 may include in DNS response message 624 the negative classification data from IP address 1.2.3.4. In addition, the classification database may be continually dynamically updated with links between domain names and IP addresses as DNS queries are resolved. Thus, for example, the embodiment provides for imputing negative classification data in the case of phishers that host multiple domains on the same IP address (e.g., the same server), the same ASN, or in the same subnet, as determined by the IP address being relatively close.

Figure 7:
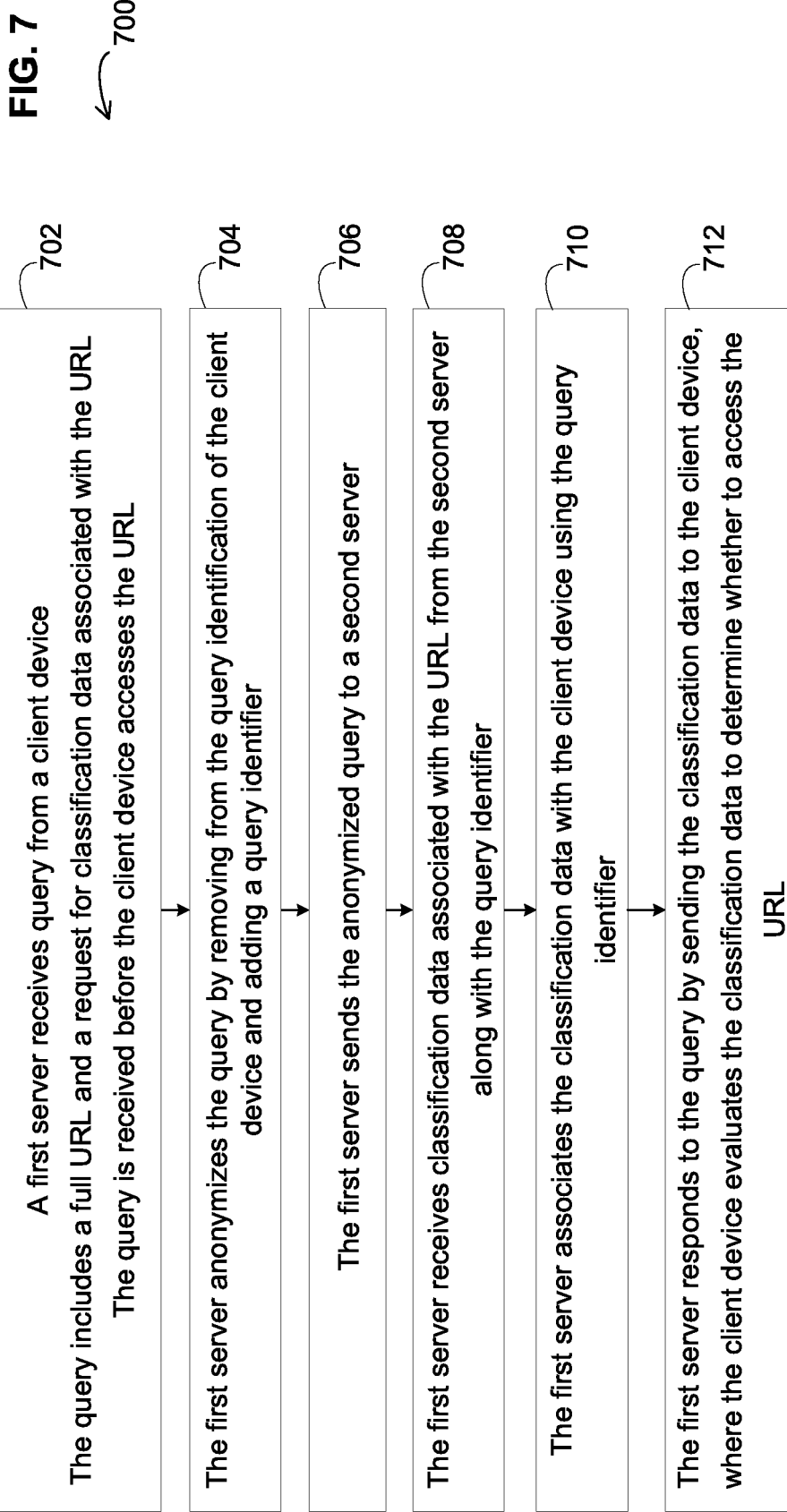
FIG. 7 is a flow chart of a method for assessing a uniform resource locator (URL) according to an embodiment.

FIG. 7 is a flow chart of a method 700 for assessing a uniform resource locator (URL) according to an embodiment. In FIG. 7, in step 702, a first server receives query from a client device. The query includes a full URL and a request for classification data associated with the full URL. And the query is received before the client device accesses the URL. In step 704, the first server anonymizes the query by removing from the query identification of the client device and adding a query identifier. In step 706, the first server sends the anonymized query to a second server. In step 708, the first server receives classification data associated with the URL from the second server along with the query identifier, where the classification data may include any of, e.g., an assessment of the URL, classification data associated with the URL, or a command regarding the access of the URL by the client device. In step 710, the first server associates the classification data with the client device using the query identifier. And in step 712, the first server responds to the query by sending the classification data to the client device, where the client device evaluates the classification data to determine whether to access the URL.

In a further embodiment of method 700, in step 702, when the first server initially receives the query, the URL is encrypted and the query also includes an encrypted client public key. The second server, on receiving the query, decrypts the URL and client public key. For example, the URL and client public key may be encrypted using the second server's public key. In step 708, when the first server receives classification data, the classification data is also encrypted. For example, the second server may encrypt the classification data using the client's decrypted public key. Thus, in the embodiment, the first server does not know the destination URL or classification data, and the second server does not know the identity of the client device. In an embodiment similar to the one described above, a symmetric key can be established between the client and the second server to encrypt communications between these two parties.

Figure 8:
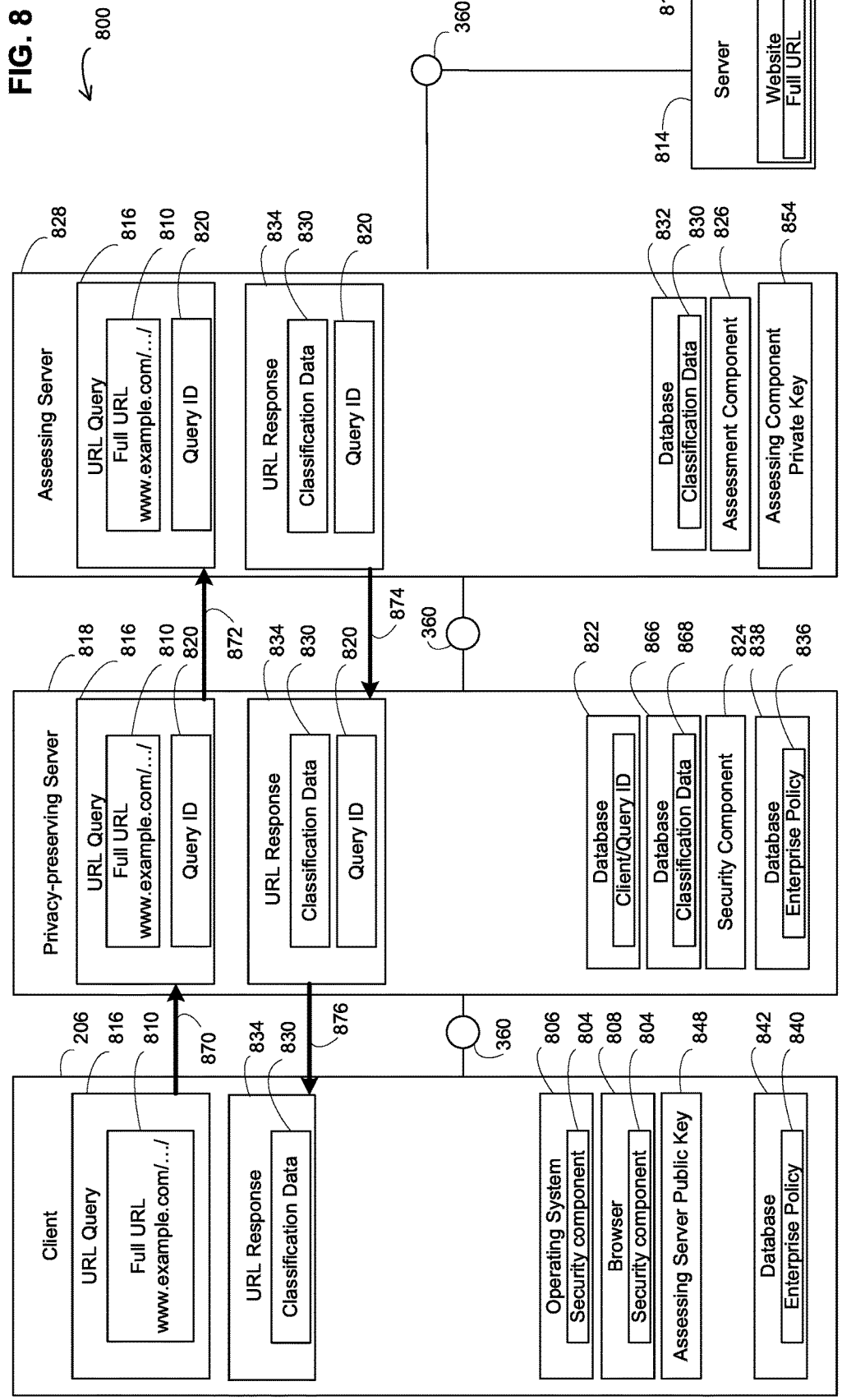
FIG. 8 is an exemplary block diagram of a system and method for assessing a uniform resource locator (URL) according to an embodiment.

FIG. 8 is an exemplary block diagram of a system 800 for assessing a uniform resource locator (URL) according to an embodiment. In FIG. 8, a browser security component 804 is embedded in either the operating system 806 or browser application 808. Operating system 806 or browser application 808 each have access to a resolve full URL 810 before the browser initiates a communication with a website 812 identified by full URL 810 on a third-party server 814. Thus, security component 804 embedded in operating system 806 or browser application 808 may receive full URL 810, before browser 808 initiates a communication with the URL from operating system 806 or browser application 808. As a result, security component 804 may transmit 870 a URL query 816 that includes full URL 810 to a privacy-preserving server 818 with a request for an assessment of full URL 810.

A security component 824 on privacy-preserving server 818 may then associate a query identifier (query ID 820) with the request and client 206, add query ID 820 to URL query 816, and associate query ID 820 with client 206 in a database 822. Security component 824 may also remove from URL query 816 any information that may identify client 206, and transmit 872 query 816 to an assessment component 826 executing on an assessing server 828.

Assessing server 828 receives URL query 816, full URL 810, and query ID 820, but not the identity of client 206. Assessment component 826 retrieves full URL 810 and retrieves associated classification data 830 (or assessment data) regarding full URL 810 from one or both of an associated classification data database 832, or from a third-party classification data database (not shown). Assessment component 826 then adds classification data 830 and query ID 820 to a URL Response 834 and transmits 874 URL response 834 back to privacy-preserving server 818.

Security component 824, using query ID 820 in URL response 834 and database 822, determines that client 206 is the proper recipient of classification data 830 and transmits 876 URL response 834 to client 206. Browser 808 may be instructed to wait for an assessment from security component 804 before initiating contact with the URL.

In this manner, the use of two servers, the first being anonymizing, privacy-preserving server 818, is much like the embodiments referred to with regard to FIG. 1 through FIG. 7 in that the first server is an anonymizing server or proxy, the use of which prevents the results of the second server from being associated with the client. Also, similar to the embodiments of FIG. 1 through FIG. 7, classification data 830 may be used by both privacy-preserving server 818 and client 206. In that regard, classification data 830 may include a variety of assessments including: whether to block access, whether to allow access, and data regarding URL 810 that may allow another security component to make a determination as to whether to block or allow access. Thus, classification data 830 may be compared by security component 824 against an enterprise policy 836 in a database 838 that is associated with client 206. The comparison may result in URL response 834 including an assessment or command regarding whether client 206 may access URL 810. If the comparison is agnostic or otherwise indeterminate, the comparison may result simply in classification data 830 being forwarded to client 206, at which point security component 804 may compare classification data 830 against an enterprise policy 840 associated with client 206 in a database 842 to determine whether client 206 is allowed to access URL 810.

In the embodiment described with respect to FIG. 8, privacy-preserving server 818 has knowledge of both full URL 810 and client 206. This would not be an issue if the privacy-preserving server were completely trusted, e.g., if the server were an Apple server that knows it is the only server allowed to see the full URL and know the identity of the client. Also, in the embodiment, privacy-preserving server 818 may be an enterprise server associated with client 206, or not. And privacy-preserving server 818 may be operated by the browser vendor, the OS vendor, or a third party independent organization. The function of privacy-preserving server 818 is to divorce the identity of client 206 from the assessment of URL 810. For this, privacy-preserving server 810 may be associated in some way with client 206, just so long as the association between the server and client does not, by itself, identify the client more than is desirable. For example, should privacy-preserving server 818 be associated with a company such as Apple, client 206 may potentially be identified as a user of an Apple device, which would generally not be considered a loss of privacy. However, if privacy-preserving server 818 were associated with a very small enterprise, the identity of client 206 may be one of only a small number of devices, which may not adequately preserve privacy. In the embodiment, assessing server 828 may be a third party server that performs assessments of URLs. In addition, because privacy-preserving server 818 knows the identity of client 206 and has access to full URL 810, security component 824 may perform the assessment of full URL 810 using an associated database 866 to retrieve classification data 868.

Data Loss Prevention (DLP) is the practice of detecting and preventing data breaches, exfiltration, or unwanted destruction of sensitive data by detecting and blocking sensitive while in use (endpoint actions), in motion (network traffic), and at rest (data storage). Organizations can use DLP to protect and secure their data in addition to complying with regulations. Enterprises can protect data on devices like PCs, especially such devices are operating inside a network perimeter, using traditional DLP (Data Loss Prevention) solutions. Many such solution are able to examine communications to/from the device and to match the data being sent/received against definitions of types of sensitive data. However mobile devices have operating systems which do not support such inspection of data being sent received.

In an embodiment, two certificates can be placed on a mobile device which allows for inspection of communications on a mobile device for a select communication paths A matching operation against types of sensitive data (regexes, similarity to known sensitive content, etc.) is then possible. Privacy can be preserved by only sending off the device an indication of what type of data matched the content. Later admin can request what actual data (from the device), with or without user consent.

In an embodiment, a signing certificate can be placed on device (e.g., in the certificate store). In response to a network request identified as requiring an inspection (e.g., determined by device, determined by the enterprise policy, determined by the security component, determined by DLP policy), the request can be intercepted and a destination certificate can be created on the device. For example, if a device attempts to access abc.com and it is determined this request should be intercepted, a local destination certificate for abc.com can be created using the signing certificate on the device. The request to abc.com can be received by a component on the device and because the abc.com certificate (local destination certificate) can be validated by the device as authentic the request can be viewed by the component on the device. Once the request is reviewed by the component the request can be transmitted to abc.com.

In some embodiments, after the request is intercepted and it is determined that intercept is no longer required in the session, a redirect request can be sent and the communication between the device and the destination server (e.g., abc.com) can direct without the interception from the security component.

In at least one embodiment, the signing certificate can be unique to the individual device. Since the signing certificate can generate trusted certificates, and the security component can be configured to accept trusted certificates associated with specific signing certificates there is security risk to having a signing certificate compromised. Therefore, it is preferable to have signing certificates unique to the individual devices. In the event that the signing certificate is compromised, the signing certificate unique to the individual device would not be a risk to other devices. For example, device A can be associated with signing certificate A, and device A is configured to trust certificates signed by signing certificate A; device B can be associated with signing certificate B, and device B can be configured to trust certificates signed by signing certificate B. In the example, if signing certificate as comprised and used to generate a trusted certificate Z, the trusted certificate Z would not be identified as valid by device 1B, because the signing certificate associated with device B is signing certificate B and not signing certificate A.

In some embodiments, the intercepted request and/or communication can be reviewed in accordance with the DIP policies In at least one embodiment, the DLP policy can be stored on a security server and sent to the device based on the destination associated with a request. For example, if the intercepted communication is determined to be with a financial institution then the DLP policy associated with the financial institution communication can be pulled/pushed from a server or identified on the device; the communication can be analyzed in accordance with the appropriate DLP policy. The analysis can be performed locally on device in a privacy preserving manner.

In at least some embodiments, the determination of the appropriate DLP policy can be based on the analysis of the DNS request The analysis of the DNS request can include determining the enterprise policy based on the authentication information associated with the DNS.

In at least one embodiment, the DLP policy can be configured for phishing and content protection. In at least one embodiment, the DLP policy can configured to review domains that are identified as gray domains. A gray domain is a domain that contains both URLs with legitimate content and phishing content. For example, if a domain is identified as a gray domain the communication can be intercepted and the site being accessed can be analyzed to determine whether it includes phishing content, or other content identified as problematic by the DLP policy. In response to determining that the content is phishing content, the DLP policy can indicate that the site should be blocked, input can be blocked, or other security action can be taken. In at least one embodiment, the DLP policy can include analysis of traffic associated with browser extensions in an embodiment the DLP policy can be configured to review domains that are identified as unknown domains (domains which have not been previously encountered and analyzed for a classification), or domains that are identified as recent domains (domains which were registered at a domain registrar within a threshold period of time, such as domains that are less than 30 days old).

Figure 9:
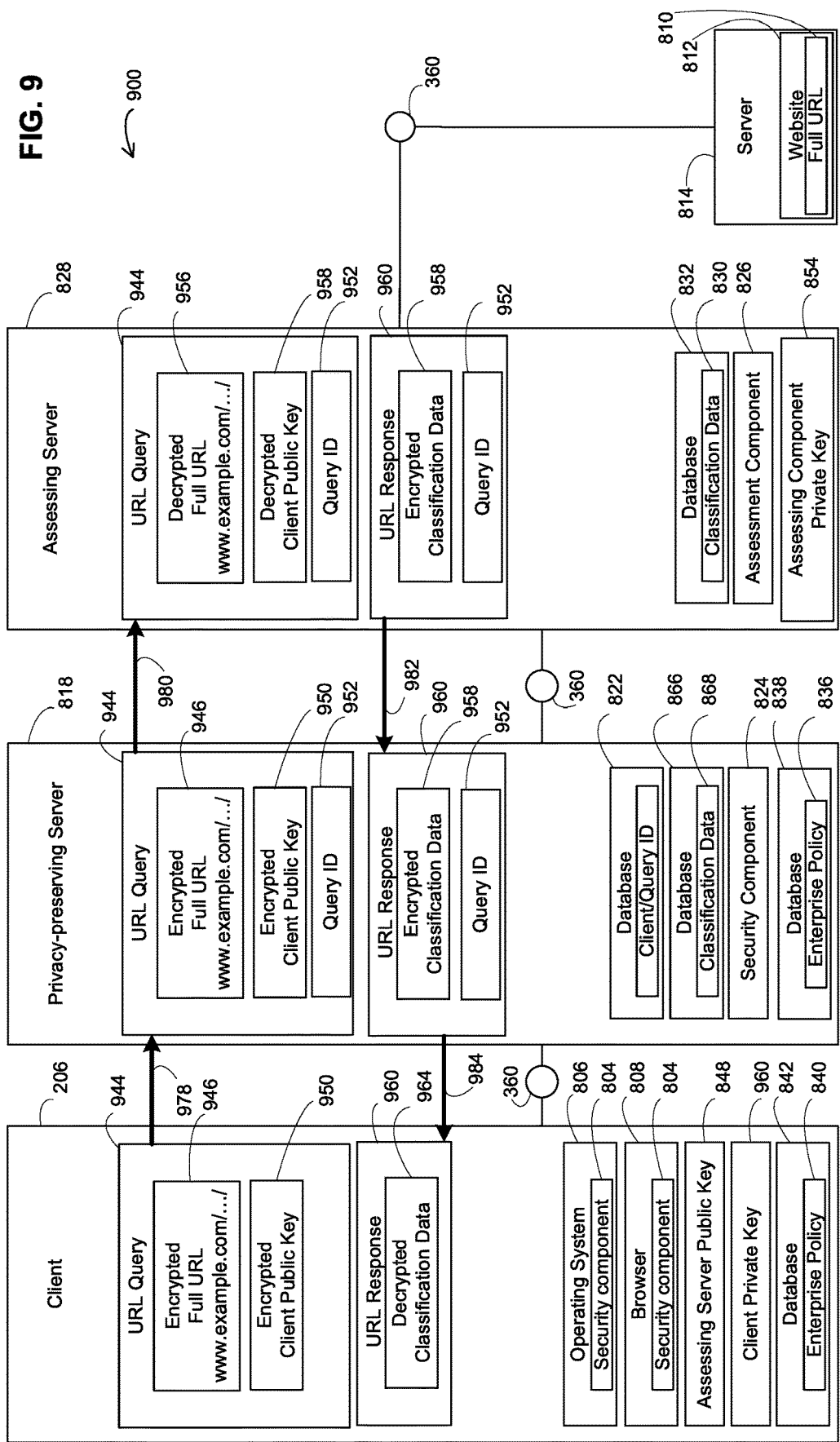
FIG. 9 is an exemplary block diagram of a system and method for assessing a uniform resource locator (URL) according to an embodiment.

FIG. 9 is an exemplary block diagram of a system 900 for assessing a uniform resource locator (URL) according to an embodiment. FIG. 9 may be implemented using the system of FIG. 8, and using many of the steps of FIG. 7 and FIG. 8. In FIG. 8, the privacy-preserving server was given knowledge of both the full URL and the client identity. In FIG. 9, privacy-preserving server 818 is given knowledge of client 206, but is not given a full URL 956, and also is not allowed access to a decrypted assessment 964.

In the embodiment discussed with regard to FIG. 9, security component 804 may create an assessment query 944 that includes an encrypted URL 946 using a public key 948 associated with assessing server 828. Security component 804 may include in assessment query 944 a client public key 950 for assessing server 928. This may be done as described above with regard to FIG. 1 through FIG. 6 and the use of public and private keys, but without resort to the use of the EDNS(0) protocols. URL query 944 is then transmitted 978 to privacy-preserving server 818. Subsequently, after removing reference to client 206, privacy-preserving server 818 may transmit 980 URL query 944 with encrypted full URL 946 and a query ID 952 associated with client 206 to assessing server 828. Assessing component 826 may decrypt query 944 and client public key 958 using an assessing server private key 954 to obtain full URL 956 and perform an assessment as described above with regard to FIG. 1—FIG. 8. Subsequently, assessing component 826 may encrypt the classification data 958 and transmit 982 a URL response 960 back to privacy-preserving server 818, which transmits 984 encrypted classification data 958 on to client 206 as described before with regard to FIG. 8. Client security component 804 may then use client private key 962 to decrypt classification data 964 and proceed as described above with the classification data as it related to URL 956. Thus, in this embodiment, privacy-preserving server 818 only has knowledge of client 206, but does not see full URL 956, and does not see decrypted assessment 964.

A benefit of the embodiments of browser protection while preserving privacy is that database 832 may be a dynamic database built by assessing server 828 with full URLs and associated assessments from the collective results of the assessments from a population of clients. From such a dynamic database a list of assessed URLs (e.g., URLs that are whitelisted or blacklisted) may be deployed to one or more of the clients of the population. The list is dynamic in the sense that the database may be updated after every assessment. For example, client A and client B may be associated with an enterprise. Client A may have a security component with a content blocker that is based on a list from the dynamic database. Client B may be using the content assessment and DNS resolution method as described above and an embodiment of browser protection while preserving policy. With client B sending all of its full URLs to assessing server 828 for assessments, assessing server 828 and assessment component 826 continually update database 832 making database 832 a dynamic list of URLs that may be common or otherwise relevant to clients of the same enterprise. From database 832, assessing component 826 may compile a list of full URL assessments (e.g., whitelisted and blacklisted URLs) and return that list to enterprise client A through privacy-preserving server 818. Subsequently, the security component on client A may publish the list to other clients associated with the enterprise. In embodiments, when a client authenticates the authenticating server, the list may be provided to the client, or an authorization token for some server may be granted to the client, which can at any (or multiple) later times allow the client to connect to the authentication server or some other server to obtain the list.

In embodiments, an ability to refresh the list of full URLs to be blocked exists in, for example, content filtering extensions in a browser, or browser extensions which do not have a WebRequest Blocking capability. Such extensions provide a list of URLs to be blocked to the browser, and the browser uses this list itself to determine whether a URL should be blocked or not. While these do not allow constant updates, they do allow periodic updates. Such periodic updates would cover the situation where, from assessment requests by protected devices, e.g., the CEO, etc., it is determined that an enterprise is being targeted. From the enterprise-specific assessments, assessing component 726 may provide, to clients associated with the enterprise, updated blacklists, whitelists, or content filters. In at least one embodiment, the full URL can be viewed based on the DLP policy.

Furthermore, in embodiments, the systems include various pieces of network architecture, such as firewalls, secure web gateways, CASBs, and other elements that may perform their own protective blocking. As assessing component 826 discovers full URLs that should be blocked, or that might be targeting the enterprise, etc., the network architecture may be provided with updated blacklists, whitelists, or content filters.

With regard to FIG. 7 through FIG. 9, the various embodiments may also use the methods discussed previously to authenticate client 206 with privacy-preserving server 818.

In an embodiment, while browsers extensions do not typically send DNS resolution requests, they do contact IP addresses. In this embodiment, outgoing IP addresses of browser extensions may be evaluated in a manner analogous to the evaluation described above of full URLs. In the embodiment, the outgoing IP address may, in advance of connecting with the IP address, be checked to determine whether the addition of the extension should be permitted or denied. For example, the IP address may be checked against a list of known-bad IP addresses (a blacklist) or known-good IP addresses (a whitelist), or the IP address may be evaluated using retrieved classification data against a policy associated with the client device to determine whether the extension should be allowed. Furthermore, any information received about the IP address and the browser extension, good or bad, may be shared with other devices, such as enterprise-related devices.

In embodiments, the security component on the client device may be implemented as a browser extension, e.g., in desktop browsers, or in the few mobile browsers that support extensions. In embodiments, the security component on the client device may be implemented as the DNS resolver in the operating system, e.g., in Windows, or MacOS, or ChromeOS, or iOS, etc. Furthermore, in embodiments, the security component on the client device may be implemented in both the device's DNS resolver and in a browser extension, in which case the two implementations of the security component may share or exchange information between themselves. For example, the browser extension version of the security component sees the full URL as part of a determination of whether the URL is safe. With domain name that is typically in the URL, the browser extension version can send the domain name to the DNS resolver version in order to receive classification data as discussed previously. Should the full URL include the IP address, that too, may be communicated to the DNS resolver version in order to receive classification data as well. Thus, with a security component implemented in both the DNS resolver and in a browser extension, the client device may receive from the first server classification data regarding whether the URL is safe and classification data regarding whether the domain name or IP address in the URL is also safe.

Figure 10:
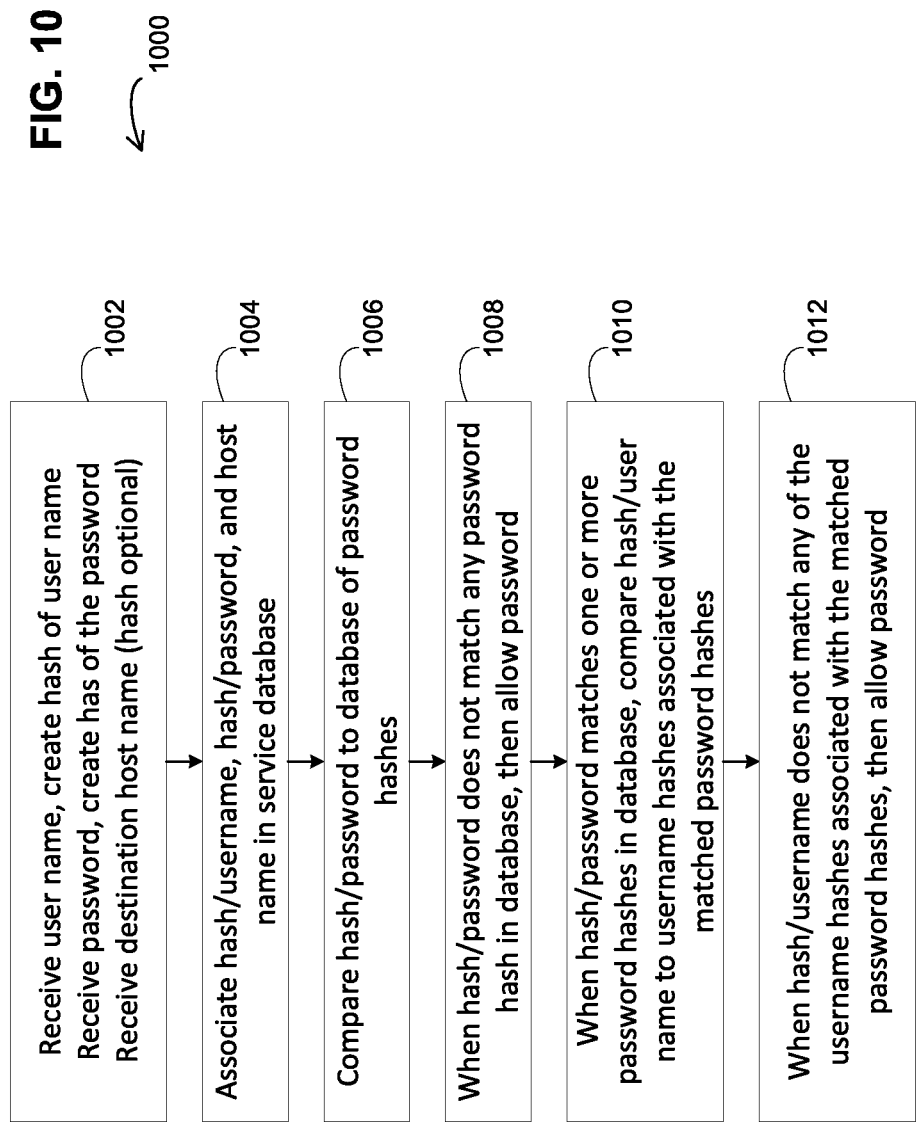
FIG. 10 is a flow chart of a method for preventing password re-use according to an embodiment.

FIG. 10 is a flow chart of a method 1000 for preventing password re-use according to an embodiment. The negative aspects of password re-use are not necessarily limited to re-use of the entire password. When a user re-uses part of a password in combination with something else, the re-used part may be correlated between passwords and contribute to an unauthorized access of the user's account. For example, a user may have a habit of creating passwords using their name spelled backwards, their birthday in reverse order and then the name of the website associated with the account.

Embodiments of a secure service for detecting and preventing password re-use may be implemented as a service in the operating system, a browser, or otherwise in a password manager.

In an embodiment, password security may be achieved by not storing the passwords or the usernames themselves. Instead, the destination (an application name or a destination host name, which may optionally be hashed) may be associated with a hash of the password and a hash of the user. The three may be stored in a database accessible to the service. When the service is implemented on a user device, the storage location may be a secure location, e.g., a secure enclave processor for iOS, or the Trusted Execution Environment (TEE) of Android. In an embodiment, the service may be implemented on a server or other piece of network architecture. In the embodiment, the service may be queried when a user, e.g., user1, enters a new password. When a new password, e.g., p/w1, is entered for a destination, e.g., xyz.com, a security component may take a hash of the password, a hash of the destination, and a hash of the username, and send an association of the three to the service. The service may then compare the hash of the new password to password hashes stored in the database. If the comparison determines that no hash in the database matches the hash of the new password, then the new password may be allowed and the service informs the security component accordingly. If the comparison shows that one or more hashes in the database match the hash of the new password, then the hash of the username is compared to the username hashes in the database associated with the matching password hashes to determine if the new password has been used by user1 before. If none of the username hashes associated with matching password hashes match the hash of user1, then the new password may also be allowed (because user1 has not used the new password before, even though another user has) and the service informs the security component accordingly.

Thus, in an embodiment of a method 1000 illustrated in FIG. 10, in step 1002 a password security service operating on a server receives from client device, a user name, password, and destination host. The security service creates a hash of the user name (h/username), a hash of the password (h/password), and, optionally, a hash of the host name (h/hostname). In step 1004, the security service associates the h/username, h/password, and hostname or h/hostname. In step 1006, the security service accesses a service database and compares the h/password to the password hashes in the database. In step 1008, when h/password does not match any password hash in the database, the service informs the client device that the password is allowed. In step 1010, when h/password matches one or more password hashes in the database, h/user is compared to the username hashes associated with the matched password hashes from the database. In step 1012, when h/username does not match any of the username hashes associated with the matched password hashes, then the service informs the client device that the password is allowed. Otherwise, the service informs the client device that the password is not allowed.

The embodiment of FIG. 10 reflects an enterprise policy that allows the same password to be used once by any user. In an embodiment, an enterprise policy may prevent a password from being used by more than one enterprise user. For example, the policy may be based on the idea that if more than one user has the same password, then the password is either being shared, or is not sufficiently complex. In the embodiment, the database accessible by the service may be limited to storing data from only enterprise users. Or, the database may store data for multiple enterprises and each password hash may also be associated with an enterprise (and the enterprise may itself be optionally hashed for increased security). For example, the database may store hashes of the password (h/pw1), the destination (h/xyz.com), and the user (h/user1), associated with the enterprise (hash optional). In an embodiment, if, upon the service receiving hashes of the new password and the username and the enterprise (optionally hashed), a comparison determines that no password hash in the database matches the hash of the new password, then the new password may be allowed and the service informs the client device accordingly. If the comparison shows that one or more password hashes in the database match the hash of the new password and one of the matching password hashes is also associated with the same enterprise as the user (user1), then the new password is rejected and the service informs the client device accordingly. In an embodiment in which the database is limited to a single enterprise, the security component would not need to include the enterprise along with the association of the password hash and username hash. In this embodiment, if the comparison shows that one or more password hashes in the database match the hash of the new password, then the new password is rejected and the service informs the security component accordingly.

In embodiments, an enterprise may have a policy allowing an arbitrary number of users to use the same password. In embodiments, the number of times a user may be allowed to re-use a password may be an arbitrary number other than zero.

In embodiments, the username and password may be hashed together and compared to similar username/password hashes in the database. In this embodiment, the username functions as a salt making the password, itself, unsearchable. Such an embodiment would prevent the user from re-using the password, but would not provide for preventing the general re-use of the password.

Thus, the several embodiments maintain security by storing hashes of the username and password. In embodiments above in which classification data and DNS resolutions (e.g., IP addresses) are both supplied, if user preferences or enterprise policy for a classification are such that the domain or URL should be blocked, then rather than returning IP addresses the recursive resolver may remove the IP addresses and use a DNS Response Code of NXDOMAIN to accomplish the effect of blocking communication to that domain.

Figure 11:
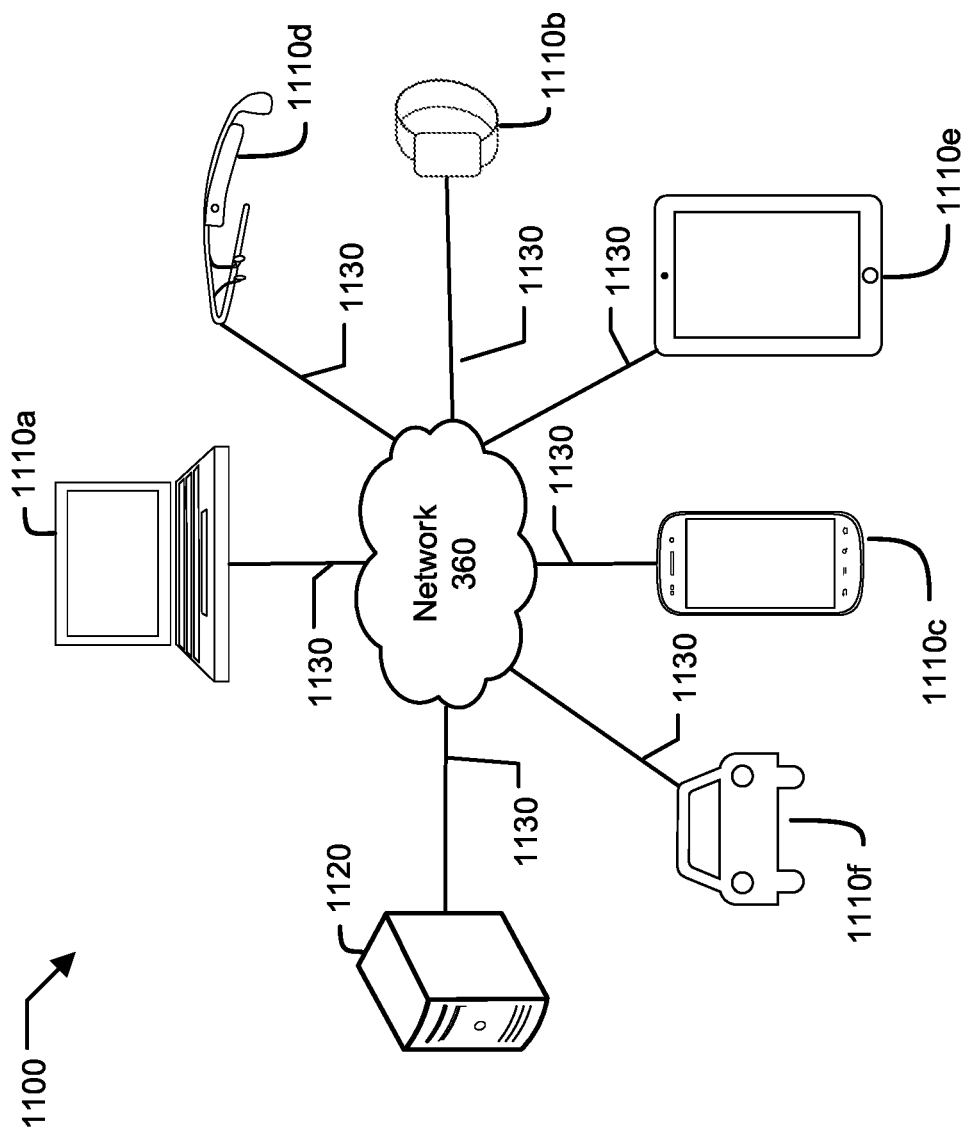
FIG. 11 is an exemplary block diagram depicting an embodiment of a system for implementing embodiments of methods of the disclosure.

FIG. 11 is an exemplary block diagram depicting an embodiment of system for implement embodiments of methods of the disclosure. In FIG. 11, computer network 1100 includes a number of computing devices 1110a-1110f, and one or more server systems 1120 coupled to a communication network 360 via a plurality of communication links 1130. Communication network 360 provides a mechanism for allowing the various components of distributed network 1100 to communicate and exchange information with each other.

Communication network 360 itself is comprised of one or more interconnected computer systems and communication links. Communication links 1130 may include hardwire links, optical links, satellite or other wireless communications links, wave propagation links, or any other mechanisms for communication of information. Various communication protocols may be used to facilitate communication between the various systems shown in FIG. 11. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VoIP), vendor-specific protocols, customized protocols, and others. While in one embodiment, communication network 360 is the Internet, in other embodiments, communication network 360 may be any suitable communication network including a local area network (LAN), a wide area network (WAN), a wireless network, a cellular network, a personal area network, an intranet, a private network, a near field communications (NFC) network, a public network, a switched network, a peer-to-peer network, and combinations of these, and the like.

In an embodiment, the server 1120 is not located near a user of a computing device, and is communicated with over a network. In a different embodiment, the server 1120 is a device that a user can carry upon his person, or can keep nearby. In an embodiment, the server 1120 has a large battery to power long distance communications networks such as a cell network or Wi-Fi. The server 1120 communicates with the other components of the personal mobile device system via wired links or via low powered short range wireless communications such as BLUETOOTH. In an embodiment, one of the other components of the personal mobile device system plays the role of the server, e.g., the watch 1110b, the head mounted device or glasses or virtual reality or augmented reality device 1110d, the phone or mobile communications device 1110c, the tablet 1110e, the PC 1110a, and/or the vehicle (e.g., an automobile, or other manned or unmanned or autonomous vehicle for land or aerial or aquatic operation) 1110f. Other types of computing devices 1110 include other wearable devices, devices incorporated into clothing, implantable or implanted devices, ingestible devices, or 'things' in the internet of things, which may be sensors or actuators or mobile or sessile devices, or hubs or servers controlling such 'things' or facilitating their communications.

Distributed computer network 1100 in FIG. 11 is merely illustrative of an embodiment incorporating the embodiments and does not limit the scope of the invention as recited in the claims. One of ordinary skill in the art would recognize other variations, modifications, and alternatives. For example, more than one server system 1120 may be connected to communication network 360. As another example, a number of computing devices 1110a-1110f may be coupled to communication network 360 via an access provider (not shown) or via some other server system.

Computing devices 1110a-1110f typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 1120 is responsible for receiving information requests from computing devices 1110a-1110f, for performing processing required to satisfy the requests, and for forwarding the results corresponding to the requests back to the requesting computing device. The processing required to satisfy the request may be performed by server system 1120 or may alternatively be delegated to other servers connected to communication network 360 or to other communications networks. A server 1120 may be located near the computing devices 1110 or may be remote from the computing devices 1110. A server 1120 may be a hub controlling a local enclave of things in an internet of things scenario.

Computing devices 1110a-1110f enable users to access and query information or applications stored by server system 1120. Some example computing devices include portable electronic devices (e.g., mobile communications devices) such as the Apple iPhone®, the Apple iPad®, the Palm Pre™, or any computing device running the Apple iOS™, Android™ OS, Google Chrome OS, Symbian OS®, Windows 10, Windows Mobile® OS, Palm OS® or Palm Web OS™, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium µC/OS-II, Micrium µC/OS-III, Windows CE, TI-RTOS, RTEMS. Other operating systems may be used. In a specific embodiment, a "web browser" application executing on a computing device enables users to select, access, retrieve, or query information and/or applications stored by server system 1120. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 12:
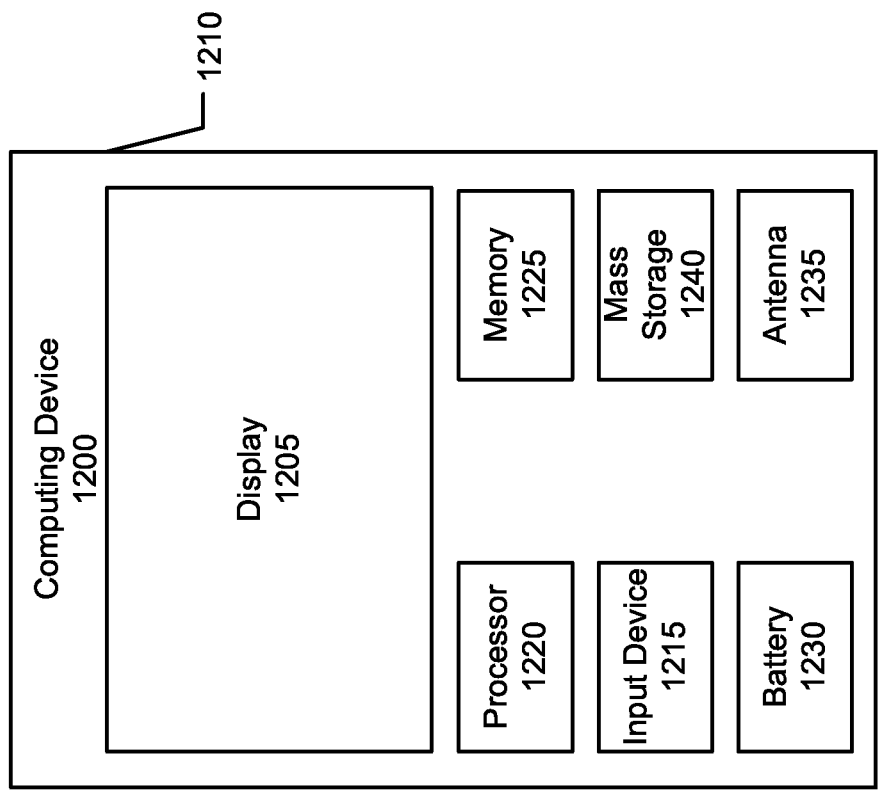
FIG. 12 is an exemplary block diagram depicting a computing device.

FIG. 12 is an exemplary block diagram depicting a computing device 1200 of an embodiment. Computing device 1200 may be any of the computing devices 1110 from FIG. 11. Computing device 1200 may include a display, screen, or monitor 1205, housing 1210, and input device 1215. Housing 1210 houses familiar computer components, some of which are not shown, such as a processor 1220, memory 1225, battery 1230, speaker, transceiver, antenna 1235, microphone, ports, jacks, connectors, camera, input/output (I/O) controller, display adapter, network interface, mass storage devices 1240, various sensors, and the like.

Input device 1215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 1240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 12 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with computer-readable medium. A computer-readable medium may include any medium that participates in providing instructions to one or more processors for execution, such as memory 1225 or mass storage 1240. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the embodiments may be stored or reside in RAM or cache memory, or on mass storage device 1240. The source code of this software may also be stored or reside on mass storage device 1240 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Swift, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, Bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, IRIX32, or IRIX64, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-HI, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11e, 802.11g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

In an embodiment, a method for classifying a full uniform resource locator (URL) comprises: receiving, by a first security component executing on a first server, a query from a client device, the query including a full URL and a request for classification data associated with the full URL, the full URL having been obtained, by a second security component embedded in an operating system or a browser executing on the client device, in advance of the browser accessing the URL; modifying, by the first security component, the query by removing from the query identification of the client device and adding a query identifier; associating, by the first security component, the query identifier with the client device in a query database; sending, by the first security component, the modified query to an assessment component executing on a second server; receiving, by the first security component from the assessment component, a response including the query identifier and classification data associated with the full URL, the assessment component having: accessed a classification data database; compared the full URL to classification data stored in the database; retrieved any associated classification data; and included the retrieved associated classification data and the query identifier in the response; retrieving, by the first security component, the identity of the client device from the query database; and sending, by the first security component, the retrieved classification data to the second security component, the second security component evaluating the classification data to determine whether to allow the browser to access the URL.

In an embodiment, a method for classifying a full uniform resource locator (URL) comprises: receiving, by a first security component executing on a first server, a query from a client device, the query including an encrypted full URL, an encrypted client public key, and a request for classification data associated with the full URL, the full URL having been obtained, by a second security component embedded in an operating system or a browser executing on the client device, in advance of the browser accessing the URL; modifying, by the first security component, the query by removing from the query identification of the client device and adding a query identifier; associating, by the first security component, the query identifier with the client device in a query database; sending, by the first security component, the modified query to an assessment component executing on a second server, the assessment component: decrypting the encrypted full URL and the encrypted client public key; accessing a classification data database; comparing the decrypted full URL to classification data stored in the database; retrieving d any associated classification data; including the retrieved associated classification data and the query identifier in a response; receiving, by the first security component from the assessment component, the response; retrieving, by the first security component using the query identifier in the response, the identity of the client device from the query database; and sending, by the first security component, the retrieved classification data to the second security component, the second security component evaluating the classification data to determine whether to allow the browser to access the URL.

While the embodiments have been described with regards to particular embodiments, it is recognized that additional variations may be devised without departing from the inventive concept.

The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A method comprising:
    creating, by a security component, a first hash of a user name associated with a user account, a second hash of a password associated with the user name and a host name;
    receiving, by a service, the first hash, the second hash, and the host name;
    accessing, by the service, a database containing host names and associated username hashes and password hashes associated with the username hashes;
    comparing, by the service, the second hash to password hashes of the database; and
    notifying, by the service, the security component that the password is allowable for use by the user account for accessing the host:
    when the comparison does not result in matching the second hash to a password hash in the database; or
    when the comparison results in matching the second hash to at least one password hash in the database, and the first hash is compared, by the service, to all username hashes associated with the at least one matching password hash, and the first hash does not match any of the username hashes associated with the at least one matching password hash.

2. The method of claim 1, wherein the comparing, by the service, the second hash to password hashes of the database, includes comparing the second hash only to a subset of password hashes, the subset of password hashes including only those password hashes that are associated with username hashes that are associated with the received host name.

3. The method of claim 2, wherein:
containing host names and associated username hashes and password hashes associated with the username hashes, includes:
containing hostname hashes and associated username hashes and password hashes associated with the username hashes, the method further comprising:
creating, by the security component, a third hash of the host name, wherein:
the comparing the second hash only to a subset of password hashes includes comparing the second hash only to a subset of password hashes, the subset of password hashes including only password hashes that are associated with username hashes that are associated with the third hash.

4. The method of claim 1, further comprising:
storing, by the service on the database, the first hash associated with the second hash when the password is determined to be allowable.

5. The method of claim 1, wherein the security component is a security component on a network-enabled client device and the service is a security service operating on a network-enabled server.

6. A method comprising:
creating, by a security component, a first hash of a user name associated with a user account, a second hash of a password associated with the user name and a host name;
receiving, by a service, the first hash, the second hash, and the host name;
accessing, by the service, a database containing host names and associated username hashes and password hashes associated with the username hashes;
comparing, by the service, the second hash to password hashes of the database; and
notifying, by the service, the security component that the password is allowable for use by the user account for accessing the host:
when the comparison does not result in matching the second hash to a password hash in the database; or
when the comparison results in matching the second hash to at least one password hash in the database, and the at least one matching password hashes are associated with less than a first limit of associated username hashes.

7. The method of claim 6, wherein the comparing, by the service, the second hash to password hashes of the database, includes comparing the second hash only to a subset of password hashes, the subset of password hashes including only those password hashes that are associated with username hashes that are associated with the received host name.

8. The method of claim 7, wherein:
a database containing host names and associated username hashes and password hashes associated with the username hashes, includes:
a database containing hostname hashes and associated username hashes and password hashes associated with the username hashes, the method further comprising:
creating, by the security component, a third hash of the host name, wherein:
the comparing the second hash only to a subset of password hashes includes comparing the second hash only to a subset of password hashes, the subset of password hashes including only password hashes that are associated with username hashes that are associated with the third hash.

9. A method comprising:
creating, by a security component, a first hash of a user name associated with a user account, a second hash of a password associated with the user name and a host name;
receiving, by a service, the first hash, the second hash, and the host name;
accessing, by the service, a database containing host names and associated username hashes and password hashes associated with the username hashes;
comparing, by the service, the second hash to password hashes of the database; and
notifying, by the service, the security component that the password is allowable for use by the user account for accessing the host:
when the comparison does not result in matching the second hash to a password hash in the database; or
when the comparison results in matching the second hash to at least one password hash in the database, and the at least one matching password hashes are associated with the first hash less than a second limit of matches.

10. The method of claim 9, wherein the comparing, by the service, the second hash to password hashes of the database, includes comparing the second hash only to a subset of password hashes, the subset of password hashes including only those password hashes that are associated with username hashes that are associated with the received host name.

11. The method of claim 10, wherein:
a database containing host names and associated username hashes and password hashes associated with the username hashes, includes:
a database containing hostname hashes and associated username hashes and password hashes associated with the username hashes, the method further comprising:
creating, by the security component, a third hash of the host name, wherein:
the comparing the second hash only to a subset of password hashes includes comparing the second hash only to a subset of password hashes, the subset of password hashes including only password hashes that are associated with username hashes that are associated with the third hash.

12. A system comprising at least one processor and memory storing instructions configured to cause at least one processor to perform actions including:
receiving, from a client device, a first hash of a user name associated with a user account, a second hash of a password associated with the user name and a host name;
accessing a database containing host names and associated username hashes and password hashes associated with the username hashes;
comparing the second hash to password hashes of the database; and
notifying the client device that the password is allowable for use by the user account for accessing the host:
when the comparison does not result in matching the second hash to a password hash in the database; or
when the comparison results in matching the second hash to at least one password hash in the database, and the first hash is compared to all username hashes associated with the at least one matching password hash, and the first hash does not match any of the username hashes associated with the at least one matching password hash.

13. The system of claim 12, wherein the comparing the second hash to password hashes of the database, includes comparing the second hash only to a subset of password hashes, the subset of password hashes including only those password hashes that are associated with username hashes that are associated with the received host name.

14. The system of claim 13, wherein:
a database containing host names and associated username hashes and password hashes associated with the username hashes, includes:
a database containing hostname hashes and associated username hashes and password hashes associated with the username hashes, the instructions further configured to cause the at least one processor to perform actions including:
receiving a third hash of the host name from the client device, wherein:
the comparing the second hash only to a subset of password hashes includes comparing the second hash only to a subset of password hashes, the subset of password hashes including only password hashes that are associated with username hashes that are associated with the third hash.

15. The system of claim 12, the instructions further configured to cause the at least one processor to perform actions including:
storing, on the database, the first hash associated with the second hash when the password is determined to be allowable.

16. The method of claim 12, wherein the at least one processor and memory are part of a network-enabled server.

17. A non-transitory storage medium storing computer-readable instructions, which when executed, cause a security component executing on at least one processor to perform actions including:
receiving, from a client device, a first hash of a user name associated with a user account, a second hash of a password associated with the user name and a host name;
accessing a database containing host names and associated username hashes and password hashes associated with the username hashes;
comparing the second hash to password hashes of the database; and
notifying the client device that the password is allowable for use by the user account for accessing the host:
when the comparison does not result in matching the second hash to a password hash in the database; or
when the comparison results in matching the second hash to at least one password hash in the database, and the first hash is compared to all username hashes associated with the at least one matching password hash, and the first hash does not match any of the username hashes associated with the at least one matching password hash.

18. The non-transitory storage medium of claim 17, wherein the comparing the second hash to password hashes of the database, includes comparing the second hash only to a subset of password hashes, the subset of password hashes including only those password hashes that are associated with username hashes that are associated with the received host name.

19. The non-transitory storage medium of claim 18, wherein:
a database containing host names and associated username hashes and password hashes associated with the username hashes, includes:
a database containing hostname hashes and associated username hashes and password hashes associated with the username hashes, the instructions further configured to cause the at least one processor to perform actions including:
receiving a third hash of the host name from the client device, wherein:
the comparing the second hash only to a subset of password hashes includes comparing the second hash only to a subset of password hashes, the subset of password hashes including only password hashes that are associated with username hashes that are associated with the third hash.

20. The non-transitory storage medium of claim 17, the instructions further configured to cause the at least one processor to perform actions including:
storing, on the database, the first hash associated with the second hash when the password is determined to be allowable.

* * * * *